(12) United States Patent
Nakamura et al.

(10) Patent No.: US 8,274,653 B2
(45) Date of Patent: Sep. 25, 2012

(54) SPECTROSCOPE

(75) Inventors: Koichiro Nakamura, Atsugi (JP); Yuzo Sasaki, Atsugi (JP); Kazuo Fujiura, Atsugi (JP); Shogo Yagi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 312 days.

(21) Appl. No.: 12/667,753

(22) PCT Filed: Jul. 30, 2008

(86) PCT No.: PCT/JP2008/063629
§ 371 (c)(1),
(2), (4) Date: Jan. 5, 2010

(87) PCT Pub. No.: WO2009/017142
PCT Pub. Date: Feb. 5, 2009

(65) Prior Publication Data
US 2011/0058166 A1  Mar. 10, 2011

(30) Foreign Application Priority Data

Jul. 31, 2007 (JP) ................. 2007-199741
Jun. 25, 2008 (JP) ................. 2008-165624

(51) Int. Cl.
*G01J 3/28* (2006.01)
(52) U.S. Cl. ....................... 356/326; 356/328
(58) Field of Classification Search .......... 356/326, 356/328
See application file for complete search history.

(56) References Cited

U.S. PATENT DOCUMENTS 6,999,169 B2 * 2/2006 Sanpei et al. ............ 356/328
2006/0103841 A1  5/2006 Ohishi et al.

FOREIGN PATENT DOCUMENTS

| JP | 08-159867 | 6/1996 |
| JP | 2004-286582 | 10/2004 |
| JP | 2005-084029 | 3/2005 |
| JP | 2006-138734 | 6/2006 |
| JP | 2008-040089 | 2/2008 |

OTHER PUBLICATIONS

International Preliminary Report on Patentability and Written Opinion issued in PCT Application No. PCT/JP2008/063629 on Mar. 4, 2010 (English translation).
Kohji Kushida, *The Physics of Light*, Kyoritsu Shuppan Co. Ltd., First Edition, 8th Impression, Apr. 15, 1993, pp. 128-135 (partial translation).
Kohji Kushida, *The Physics of Light*, Kyoritsu Shuppan Co. Ltd., First Edition, 8th Impression, Apr. 15, 1993, pp. 128-135 (partial translation).

* cited by examiner

*Primary Examiner* — Layla Lauchman
(74) *Attorney, Agent, or Firm* — Workman Nydegger

(57) ABSTRACT

The present invention provides a small spectroscope that has a short response time. A spectroscope according to one embodiment of the present invention includes: a beam deflector that includes an electro-optic crystal, having an electro-optic effect, and paired electrodes used to apply an electric field inside the electro-optic crystal; spectroscopic means for dispersing light output by the beam deflector; and wavelength selection means for selecting light having an arbitrary wavelength from the light dispersed and output by the spectroscopic means.

18 Claims, 22 Drawing Sheets

SPECTROSCOPE

TECHNICAL FIELD

The present invention relates to a spectroscope, and more particularly to a spectroscope for selecting an optical signal having an arbitrary wavelength.

BACKGROUND ART

A spectroscope is employed for a device for measuring spectral characteristics of substances, such as absorption spectrums and fluorescence spectrums (see non-patent document 1).

A conventional spectroscope employing a prism is shown in FIG. 1. This spectroscope 100 includes a prism 101, which serves as spectroscopic means, a slit plate 102, which serves as wavelength selection means, and a photodetector 103.

A conventional spectroscope employing a diffraction grating is shown in FIG. 2. This spectroscope 200 includes a diffraction grating 201, which serves as spectroscopic means, a slit plate 202, which serve as wavelength selection means, and a photodetector 203.

Referring to FIGS. 1 and 2, wavelength dispersion elements, such as the prism 101 and the diffraction grating 201, are employed as spectroscopic means, and input light is spatially dispersed in directions that differ for individual wavelengths. From the dispersed light, only one portion is extracted by the wavelength selection means, and thus, light having a specified wavelength can be obtained. At such a time, when either the prism 101 or the diffraction grating 201 is mechanically rotated, an arbitrary wavelength to be extracted can be selected.

Furthermore, for an optical communication field, a spectroscope is employed to select a wavelength during signal processing. A conventional spectroscope employing an arrayed waveguide grating is shown in FIG. 3. An arrayed waveguide grating 301 includes an input slab waveguide 303, connected to an input waveguide 302, an output slab waveguide 306, connected to an output waveguide 307, and arrayed waveguides 304, which connect the input slab waveguide 303 and the output slab waveguide 306. A specific length difference between adjacent waveguides is employed for the arrayed waveguides 304, and heaters 305a and 305b are relatively positioned for the individual waveguides.

An optical signal received at the input waveguide 302 is transmitted, via the input slab waveguide 303, and distributed to the arrayed waveguides 304. On the plane of incidence for the output slab waveguide 306, the optical signal is allocated for a different phase that is consonant with the wavelength of the signal. Since the output slab waveguide 306 serves as a collective lens, at the boundary between the output slab waveguide 306 and the output waveguide 307, the optical signal is collected at a different location in accordance with its wavelength. Therefore, only an optical signal having a specified wavelength, which has been collected at the boundary between the output slab waveguide 306 and the output waveguide 307, is output through the output waveguide 307.

At this time, a current is supplied to the heater 305a or 305b, arranged along the arrayed waveguides 304, and a thermo-optic effect is employed to change the equivalent refractive index of the arrayed waveguides 304. When the equivalent refractive index has been changed, the phases of optical signals passing through the arrayed waveguides 304 are shifted. Therefore, when a phase shift is controlled, only an optical signal having an arbitrary wavelength will be output through the output waveguide 307.

Non-patent Document: "The Physics of Light", Kohji Kushida, Published by Kyoritsu Shuppan Co. Ltd., First edition, Eighth impression, Apr. 15, 1993.

DISCLOSURE OF THE INVENTION

However, a problem exists in that the conventional spectroscopes in FIGS. 1 and 2 must include a mechanical control units, such as a motor for mechanically rotating either a prism or a diffraction grating, whichever serves as the spectroscopic means, and a drive circuit for driving the motor, and that the structure of the spectroscopes is increased. Here also, another problem exists in that since this operation is performed mechanically, the response time required for varying a wavelength is long, and several ms are required.

Referring again to the conventional spectroscope illustrated in FIG. 3, a large amount of electricity must be supplied to the heaters in order to produce the thermo-optic effect. Since a heat control mechanism is also required to supply the electric power and to cope with the heat that is generated, another problem is that downsizing of the device can not be attained. Furthermore, another defect is that the response time for varying a wavelength is long, i.e., 2 to 60 ms, because the thermo-optic effect is employed.

To resolve these problems, one objective of the present invention is to provide a small spectroscope that has a short response time.

A first embodiment of the present invention is a spectroscope characterized by comprising: a beam deflector that includes an electro-optic crystal, having an electro-optic effect, and paired electrodes used to apply an electric field inside the electro-optic crystal; spectroscopic means for dispersing light output by the beam deflector; and wavelength selection means for selecting light having an arbitrary wavelength from the light dispersed and output by the spectroscopic means.

According to the first embodiment, since the beam deflector, which includes the electro-optic crystal having an electro-optic effect, the spectroscopic means and the wavelength selection means are prepared, a short response time and downsizing of the device can be provided.

According to a second embodiment, the opening in the beam deflector is enlarged for the purpose of increasing the sensitivity of the spectroscope, in addition to a reduction in the response time and in the size of the spectroscope. That is, according to the second embodiment, the spectroscope of the first embodiment is further characterized in that the width of the beam deflector is greater than the thickness of the beam deflector. Furthermore, the spectroscope of the second embodiment may further include means for projecting, to the beam deflector, light having an elliptic shape, in cross section. In this instance, the light having the elliptic shape, in cross section, enters the beam deflector, so that a direction along the long axis of the elliptic shape matches the direction of the width.

In addition to the reductions in the response time and in the size of the device, the objective of a third embodiment is that only a single operation is required to perform both a high resolution measurement and a wideband measurement, at the same time, and to employ both a low-dispersion prism and a high-dispersion prism as spectroscopic means. That is, for the third embodiment, the spectroscope of the first embodiment is characterized in that: the spectroscopic means includes a first prism and a second prism for which refractive index dispersion is greater than that of the first prism; dividing means for outputting, in two different directions, light that is input, is further prepared; and the light output in the two different directions enter the first prism and the second prism.

In the third embodiment, the dividing means may be arranged after the beam deflector and before the first and second prisms. Further, the dividing means may also output, in the two different directions, the light that is output by the beam deflector.

Furthermore, in the third embodiment, the dividing means may be located in front of the beam deflector, and the light output in the two different directions may enter different areas in the beam deflector, and be transmitted to the first and the second prisms.

In the third embodiment, the beam deflector may also include a first beam deflector and a second beam deflector, and the dividing means may be located in front of the first and the second beam deflectors, and the light output in the two different directions may enter the first and the second beam deflector and be transmitted to the first and the second prisms.

Moreover, in the third embodiment, the wavelength selection means may include first wavelength selection means, located at the rear of the first prism, and second wavelength selection means, located at the rear of the second prism, and the second wavelength means may be movable.

In addition to the reductions in the response time and in the device size, the objective of a fourth embodiment is to provide a simple, high-resolution spectroscope, and at least one of either the input end or the output end of an electro-optic crystal, included in spectroscopic means, is wedge shaped. That is, a spectroscope according to the fourth embodiment is characterized by comprising: spectroscopic means, which includes an electro-optic crystal having an electro-optic effect and paired electrodes, used to apply an electric field inside the electro-optic crystal, and at the least, either an input end or an output end that is wedge shaped, so that the thickness of the end is gradually reduced from a first face, on which a first electrode of the paired electrodes is located, toward a second face, opposite the first face, on which a second electrode, of the paired electrodes, is located; and wavelength selection means for selecting light having an arbitrary wavelength from light that is dispersed and output by the spectroscopic means.

Also, the objectives of a fifth embodiment are the acquisition of a high resolution without increasing the angle of the deflection of light that is output by a beam deflector, which includes an electro-optic crystal having an electro-optic effect, and a reduction in a required voltage that is to be applied to the beam deflector to obtain a predetermined resolution. To achieve these objectives, a difference in optical path lengths is increased between a beam, deflector and spectroscopic means, such as a prism or a diffraction grating.

Specifically, according to the fifth embodiment, the spectroscope of the first embodiment is characterized in that: a first input position denotes a position at which light output by the beam deflector enters the spectroscopic means when a first voltage is applied to the paired electrodes; a second input position denotes a position at which light output by the beam deflector enters the spectroscopic means when a second voltage is applied to the paired electrodes; a first output position denotes a position at which light is output from the spectroscopic means when the first voltage is applied to the paired electrodes; a second output position denotes a position at which light is output from the spectroscopic means when the second voltage is applied to the paired electrodes; and in a case wherein a voltage to be applied to the paired electrodes is changed from the first voltage to the second voltage, an output shift from the first output position to the second output position is greater than an incidence shift from the first input position to the second input position.

Further, according to the fifth embodiment, a first angle may denote an angle formed, upon application of a third voltage to the paired electrodes, between the output plane of the spectroscopic means and the optical axis of light, having the shortest wavelength in a desired wavelength range for detection, that is included in light output by the beam deflector and that is output through the output plane of the spectroscopic means when the first electric field is applied for the detection of the shortest wavelength in the desired wavelength range, and a second angle may denote an angle that is formed, upon application of the fourth voltage to the paired electrodes, between the output plane of the spectroscopic means and the optical axis of light, having the longest wavelength in a desired wavelength range for detection, that is output through the output plane of the spectroscopic means when a second electric field is applied for the detection of light having the longest wavelength in the desired wavelength range. The first voltage and the second voltage may be set so that the second angle is greater than the first angle.

In the fifth embodiment, the spectroscopic means may be a prism. At this time, assume that: a third input position denotes a position at which light output by the beam deflector enters the prism when the third voltage is applied to the paired electrodes for the detection of light having the shortest wavelength in a desired wavelength range; a fourth input position denotes a position at which the light output by the beam deflector enters the prism when a fourth voltage is applied to the paired electrodes for the detection of the longest wavelength in the desired wavelength range; a third output position denotes a position at which light from the prism is output when the third voltage is applied to the paired electrodes; a fourth output position denotes a position at which light from the prism is output when a fourth voltage is applied to the paired electrodes; $\theta$ denotes an angle that is formed between the optical axis of light output by the beam deflector and the incidence plane of the prism when the third voltage is applied; $\phi$ denotes the angle of deflection of light output by the beam deflector when the fourth voltage is applied; n denotes the refractive index of the prism; $\beta$ denotes the apex of the prism; P1 denotes a distance from the apex to the third input position, and P2 denotes a distance from the apex to the fourth input position; F1 denotes a distance from the apex to the third output position, and F2 denotes a distance from the apex to the fourth output position; and L denotes a difference in an optical path length between the beam deflector and the prism. Then, $P2 = P1 + L(\sin\theta - \cos\theta \cdot \tan(\theta - \phi))$, $F1 = P1 \cos\beta + P1 \tan(\beta - \sin^{-1}(1/n \cdot \sin\theta))\sin\beta$, and $F2 = P2 \cos\beta + P2 \tan(\beta - \sin^{-1}(1/n \cdot \sin(\theta - \phi)))\sin\beta$. The optical path length difference L may be set for the beam deflector and the prism, so that a difference between F2 and F1, (F2−F1), is a predetermined value.

Furthermore, the spectroscope of the first embodiment may further include a polarizer for projecting, onto the beam deflector, light consisting of only a component along a polarization axis, which is parallel to the electric field.

Further, in the first embodiment, the spectroscopic means may be a prism.

Moreover, in the first embodiment, at the least, either the input end or the output end of the beam deflector may be wedge shaped, so that a thickness of the end is gradually reduced from the first face, where the first electrode of the paired electrodes is located, toward the second face, opposite the first face, where the second electrode of the paired electrodes is located.

Also, in the first embodiment, spectroscopic means may be a diffraction grating.

In addition, in the first embodiment, the wavelength selection means may be a slit plate.

Further, in the first embodiment, the electro-optic crystal may be one of $KTaO_3$, $KTa_{1-x}Nb_xO_3$, $K_{1-y}Li_yTa_{1-x}Nb_xO_3$ ($0<x<1$, $0<y<1$), $LiNbO_3$, $LiTaO_3$, $LiIO_3$, $KNbO_3$, $KTiOPO_4$, $BaTiO_3$, $SrTiO_3$, $Ba_{1-x}Sr_xTiO_3$ ($0<x<1$), $Ba_{1-x}Sr_xNb_2O_6$ ($0<x<1$), $Sr_{0.75}Ba_{0.25}Nb_2O_6$, $Pb_{1-y}La_yTi_{1-x}Zr_xO_3$ ($0<x<1$, $0<y<1$), $Pb(Mg_{1/3}Nb_{2/3})O_3$—$PbTiO_3$, $KH_2PO_4$, $KD_2PO_4$, $(NH_4)H_2PO_4$, $BaB_2O_4$, $LiB_3O_5$, $CsLiB_6O_{10}$, GaAs, CdTe, GaP, ZnS, ZnSe, ZnTe, CdS, CdSe and ZnO.

According to the present invention, since the beam deflector, which includes an electro-optic crystal having an electro-optic effect, the spectroscopic means and the wavelength selection means are prepared, a short response time and downsizing of the device can be obtained.

BEST MODES FOR CARRYING OUT THE INVENTION

Figure 1:
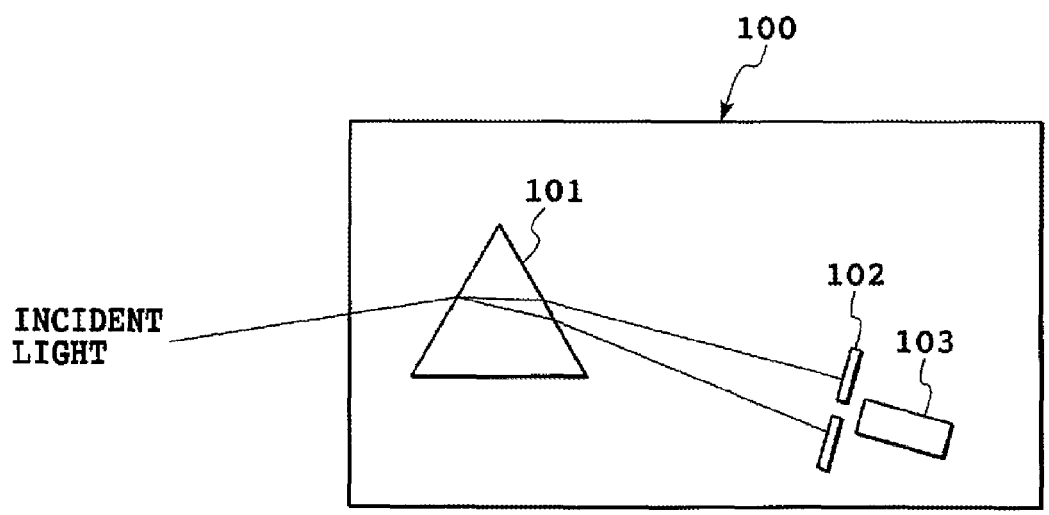
FIG. 1 is a diagram illustrating a conventional spectroscope employing a prism.
Figure 2:
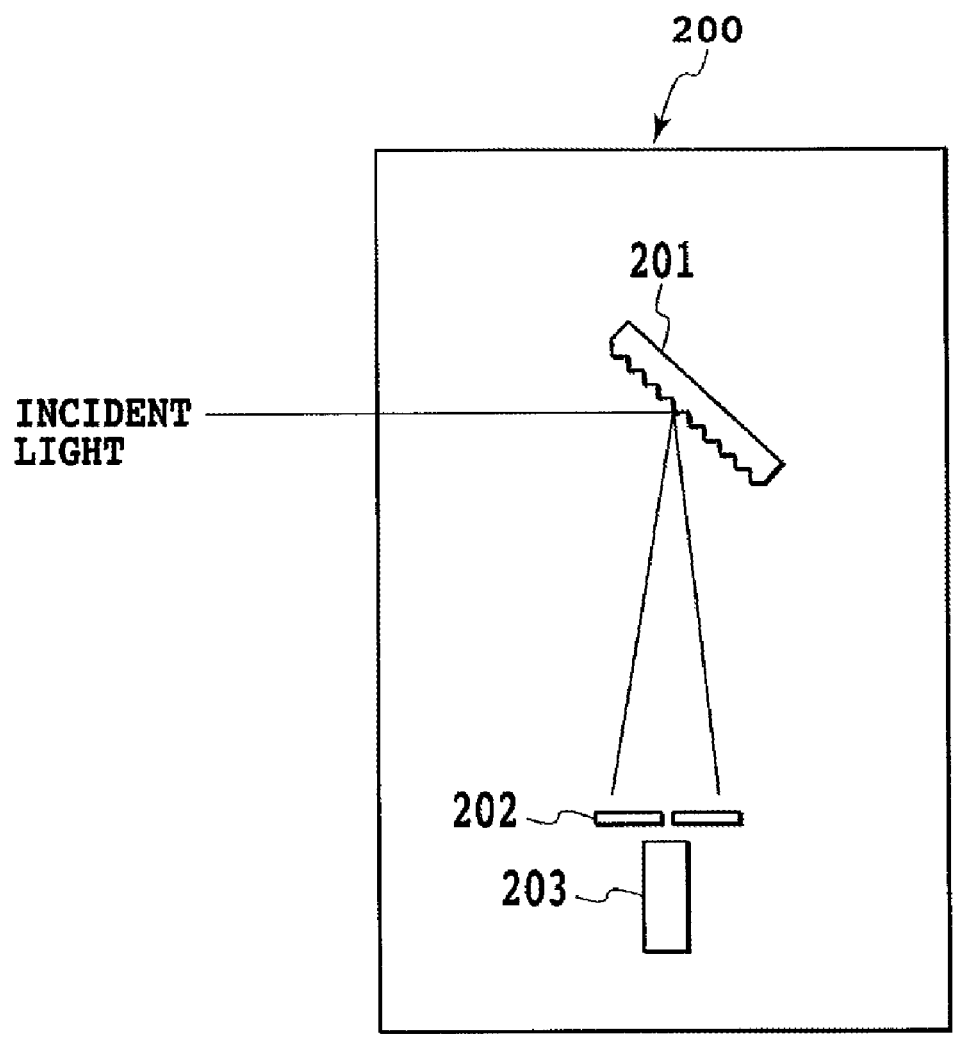
FIG. 2 is a diagram illustrating a conventional spectroscope employing a diffraction grating.
Figure 3:
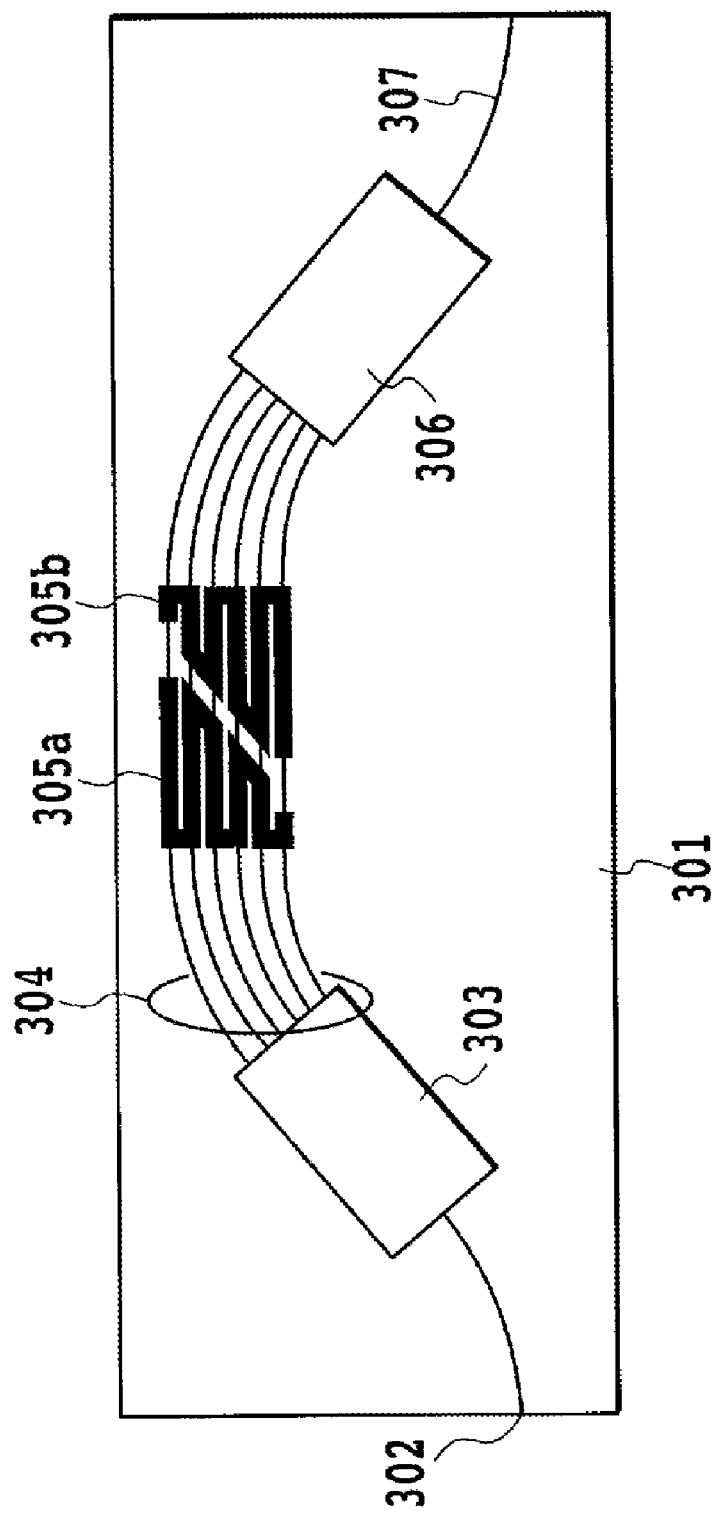
FIG. 3 is a diagram illustrating a conventional spectroscope employing an arrayed waveguide grating.

The embodiments of the present invention will now be described in detail while referring to the drawings. In the following drawings to be referred to, the same reference numerals are provided for components having the same functions, and explanation for them will not be repeated.

First Embodiment

Figure 4:
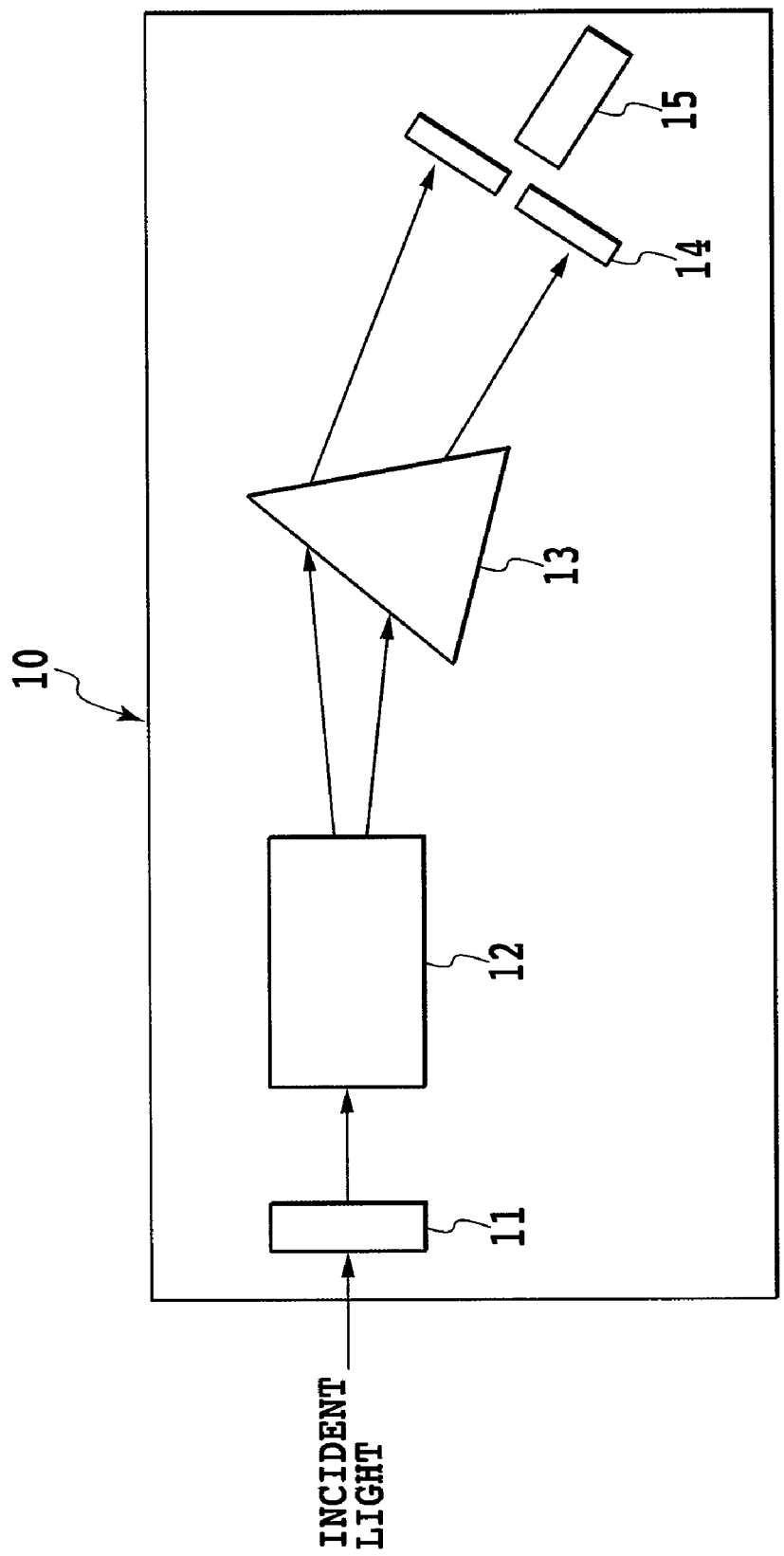
FIG. 4 is a diagram illustrating a spectroscope according to one embodiment of the present invention.

The objective of the present invention is to provide a spectroscope for which the response time and the device size can be reduced, when compared with a conventional one. To achieve this objective, according to one embodiment of the present invention, a beam deflector that deflects incident light, using an electro-optic crystal having an electro-optic effect, and outputs the deflected light is located upstream of a prism or a diffraction grating, which serves as spectroscopic means, in a direction in which dispersed light advances. FIG. 4 is a diagram illustrating the structure of a spectroscope having such an arrangement.

In FIG. 4, a spectroscope 10 includes a polarizer 11 that polarizes incident light, a beam deflector 12 formed of a crystal having an electro-optic effect, a prism 13 that serves as spectroscopic means, a slit plate 14 that serves as wavelength selection means, and a photodetector 15.

Example crystals having a large electro-optic constant are the following electro-optic crystals: $KTaO_3$, $KTa_{1-x}Nb_xO_3$ ($0<x1$, hereinafter referred to as KTN), $K_{1-y}Li_yTa_{1-x}Nb_xO_3$ ($0<x<1$, $0<y<1$), $LiNbO_3$, $LiTaO_3$, $LiIO_3$, $KNbO_3$, $KTiOPO_4$, $BaTiO_3$, $SrTiO_3$, $Ba_{1-x}Sr_xTiO_3$ ($0<x<1$), $Ba_{1-x}Sr_xNb_2O_6$ ($0<x<1$), $Sr_{0.75}Ba_{0.25}Nb_2O_6$, $Pb_{1-y}La_yTi_{1-x}Zr_xO_3$ ($0<x<1$, $0<y<1$), $Pb(Mg_{1/3}Nb_{2/3})O_3$—$PbTiO_3$, $KH_2PO_4$, $KD_2PO_4$, $(NH_4)H_2PO_4$, $BaB_2O_4$, $LiB_3O_5$, $CsLiB_6O_{10}$, GaAs, CdTe, GaP, ZnS, ZnSe, ZnTe, CdS, CdSe and ZnO.

The principle of deflection performed by the beam deflector in the embodiment of the present invention will be described while referring to FIG. 5.

For example, the beam deflector 12 includes a KTN crystal 21 having a $KTa_{1-x}Nb_xO_3$ (x=about 0.40) composition, and Ti/Pt/Au electrodes 22 and 23 are respectively formed on the upper and lower faces by vapor deposition. In this specification, use of Ti/Pt/Au indicates that Pt and Au are laminated, in this order, on the lowermost Ti layer. The KTN crystal 21 is 6 mm long (z-axis), 4 mm wide (y-axis) and 0.5 mm thick (x-axis). The electrodes 22 and 23, arranged respectively on the upper and lower faces by vapor deposition, are 5 mm long along the z-axis. In this example, the positive electrode 22 is located on the upper face and the negative electrode 23 is located on the lower face; however, these electrodes may be inverted, or a power source that can switch polarities may be connected to them.

The polarizer 11, for example, polarizes incident light, and transmits, to the KTN crystal 21, the resultant light of only a component that propagates along the polarization axis (x-axis) that is parallel to the electric field. In FIG. 4, the easy axis of transmission for the polarizer 11 is defined as a direction (x-axis) parallel to the electric field that is formed by the electrodes 22 and 23; however, the easy axis is not limited to this direction. The easy axis of transmission may be designated as a direction (y-axis) perpendicular to the direction parallel to the electric field, or a direction at an arbitrary angle relative to the direction parallel to the electric field. Or, the polarizer 11 may not be located. That is, the importance of the embodiment of the present invention is that, as will be described later, light output by the beam deflector 12 should be deflected in accordance with the state under which a voltage is applied to the KTN crystal 21. As will be described later, the electric field is inclined by applying a voltage, and light that enters the KTN crystal 21 is deflected, although the degree of deflection varies, depending on the polarization state of the light that enters the KTN crystal 21. Therefore, an arbitrary polarization state is employed for the light that enters the KTN crystal 21.

However, in a case wherein light that enters the KTN crystal 21 is vibrating in a direction parallel to the electric field, the obtained deflection angle reaches the maximum. Therefore, it is preferable that the polarizer 11 is located as shown in FIG. 4, and only the component of the incident light propagating along the polarization axis (x-axis), which is parallel to the electric field, enters the KTN crystal 21.

Especially in a case wherein an electro-optic crystal, such as KTN, having an electro-optic effect is employed to establish an ohmic contact between the electrodes, the inclination of an electric field occurs in the electro-optic crystal through the application of a voltage. Therefore, when a power source 24 is connected to the electrodes 22 and 23, and a DC voltage is applied between these electrodes, electric charges are generated inside the KTN crystal 21, and the electric field is inclined in the direction in which a voltage is applied to the KTN crystal 21.

The gradient electric field inside the electro-optic crystal causes inclination in a change of a refractive index, which is provided by the electro-optic effect on the plane perpendicular to the optical axis of the incident beam. That is, the refractive index is inclined in accordance with the inclination of the electric field. Accordingly, when the refractive index is inclined, a gradient distribution is formed for the light velocity on the plane perpendicular to the axis of the light beam. As a result, during the propagation of light through the crystal, the direction traveled by the light is sequentially changed in accordance with the inclination of the refractive index, and deflection angles are accumulated.

That is, when a voltage is applied to the KTN crystal 21 using the electrodes 22 and 23, incident light is deflected within the KTN crystal 21, and the light is output at a deflection angle θ.

Figure 5:
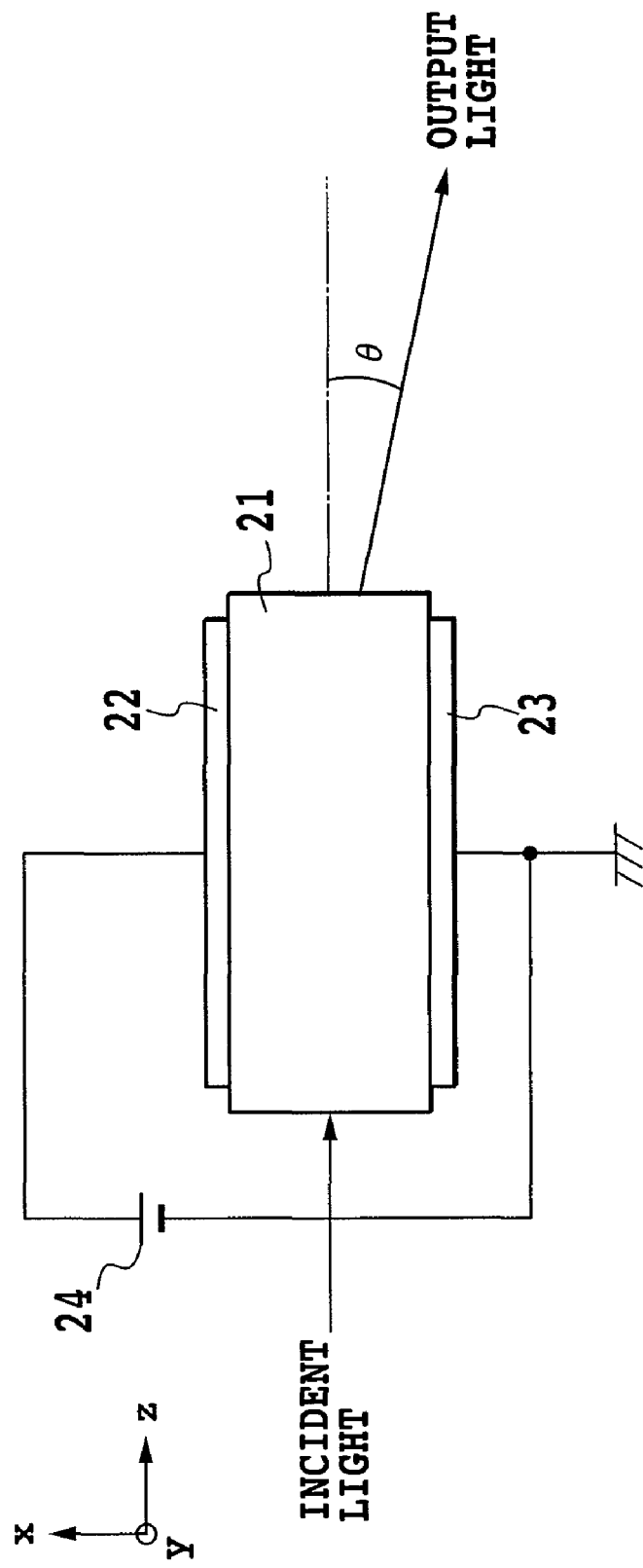
FIG. 5 is a diagram for explaining the principle of a beam deflector according to the embodiment of the present invention.
Figure 6:
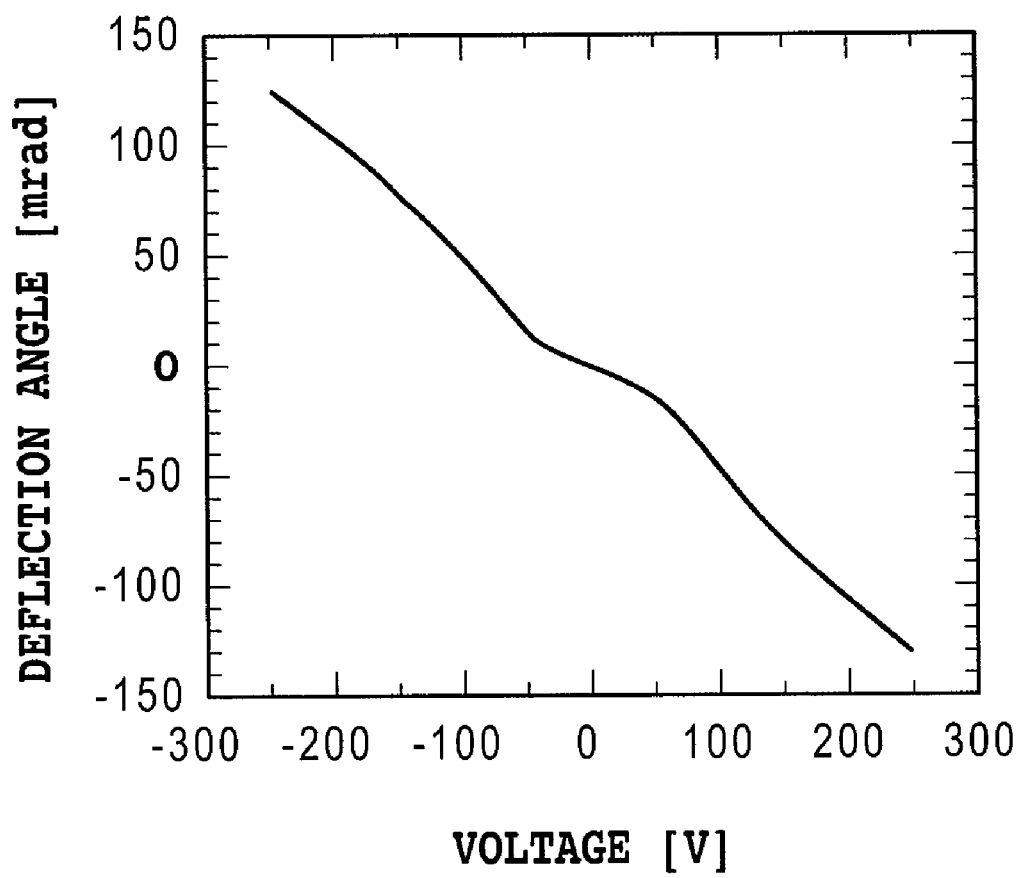
FIG. 6 is a graph showing a relationship between a voltage, applied to an electro-optic crystal, and an angle of deflection according to the embodiment of the present invention.

The relationship between a voltage applied to the electro-optic crystal and an angle of deflection is shown in FIG. 6. As shown in FIG. 5, the deflection angle θ of light output by the beam deflector 12 is a maximum of 125 mrad, relative to the application of a voltage of +250 V, or a maximum of −125 mrad, relative to the application of a voltage of −250 V. That is, in total, a deflection angle of close to 250 mrad can be obtained.

Since a large deflection angle can be obtained with such a simple arrangement, the beam deflector 12 is employed to change the incidence angle of the prism 13 that serves as spectroscopic means, and a spectroscope that has a short response time can be provided. Furthermore, a mechanical control system is not required for the spectroscope, and the size of the device can be reduced. Since simply the application of the electric field is required for the KTN crystal 21, the consumption of current is low, and a thermal control mechanism is also not necessary. Furthermore, the response time for the beam deflector 12 is a period on the order of microseconds, and can be shorter by about three digits than that of a conventional spectroscope.

Figure 7:
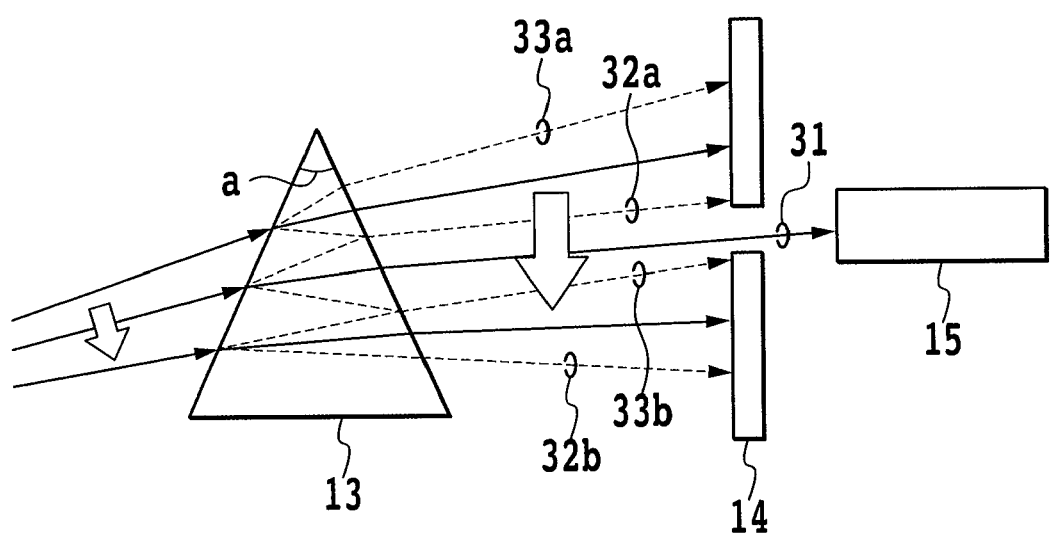
FIG. 7 is a diagram for explaining the principle of spectroscopy using a prism according to the embodiment of the present invention.

The principle of spectroscopy based on an example prism will be described while referring to FIG. 7. A prism 13 is made, for example, of BK7 glass and is 15 mm long on a side used for transmitting light, and its apex a is 60 degrees. The length of an optical path extended from the beam deflector 12 to the prism 13 is 20 mm. It should be noted that the length of the optical path can be shortened by using a smaller prism 13. In FIG. 7, reference numeral 31 denotes light having a wavelength that is selected from the incident light, and that passes through the slit plate 14. Reference numeral 32a denotes a light signal having a wavelength of 400 nm when an applied voltage is −55 V, and reference numeral 33a denotes a light signal having a wavelength of 700 nm when an applied voltage is −55 V. Furthermore, reference numeral 32b denotes a light signal having a wavelength of 400 nm when an applied voltage is +55 V, and reference numeral 33 b denotes a light signal having a wavelength of 700 nm when an applied voltage is +55 V.

In FIG. 7, assume that the wavelength range of incident light is 400 nm to 700 nm. The prism 13 is located so that when the voltage applied to the beam deflector 12 is +55 V, the light is input to the prism 13 at an incidence angle of 40 degrees, and the light signal 33b, which has a wavelength of 700 nm, is to pass through the slit plate 14 and be detected by the photodetector 15. The light output by the beam deflector 12 is dispersed by the prism 13 to light signals 32 and 33, in accordance with their wavelengths. Therefore, when a voltage applied to the beam deflector 12 is adjusted, the wavelength of the light passing through the slit plate 14 can be selected from the incident light.

The angle of incidence for the prism 13 is changed from 40 degrees to 42 degrees by changing a voltage applied to the beam deflector 12 from +55 V to −55 V. Light signals, covering the light signal 33b having a wavelength of 700 nm and the light signal 32b having a wavelength of 400 nm, can pass through the slit plate 14 and be detected by the photodetector 15. At this time, a period on the order of microseconds is required to sweep through the wavelength range of 700 nm to 400 nm.

The width of the slit in the slit plate 14 is 200 µm. Wavelength resolution depends on a beam divergence angle, wavelength dispersion of the refractive index of a prism material, the incidence angle for the prism 13 and the distance between the prism 13 and the slit plate 14. According to the first embodiment, the beam diameter of the beam deflector 12 is 400 µm, the prism material is BK7, the incidence angle for the prism 13 is 40 degrees, and the distance from the prism 13 to the slit plate 14 is 130 mm. The wavelength resolution at this time is about 4 nm, near a wavelength of 400 nm, or about 35 nm, near a wavelength of 700 nm.

(Prism)

The material of a prism will now be described by comparing the above described BK7 glass, F2 glass and SF10 glass. Table 1 shows a condition for the minimum angle of deviation when 550 nm is the central wavelength of incident light and a difference in the angle of refraction between a wavelength of 700 nm and a wavelength of 400 nm. The difference in the refraction angle is present because wavelength dependence of the refractive index differs for individual materials used for a prism. A difference in the refractive index between a wavelength of 700 nm and a wavelength of 400 nm is also shown in Table 1.

It should be noted that the angle of deviation is an angle at which light is deflected by a prism. That is, this angle is formed by light entering the prism and light leaving the prism. The requisite condition for the minimum angle of deviation is a condition in which the angle of deviation is the minimum, and is established for the prism when the incidence angle and the output angle are equal. When this condition for the minimum deviation angle has been satisfied, the resolution is the greatest and the light reflection loss is the smallest.

TABLE 1

| Material | Condition for Minimum Angle of Deviation | Difference in Refraction Angle | Difference in Refractive Index |
| --- | --- | --- | --- |
| BK7 glass | 49.4 degrees | 1.57 degrees | 0.018 |
| F2 glass | 53.2 degrees | 3.96 degrees | 0.036 |
| SF10 glass | 60.1 degrees | 7.42 degrees | 0.061 |

Since the wavelength resolution of the spectroscope is increased when a difference in the refraction angle is large, the highest wavelength resolution is obtained when SF10 glass is selected as a prism material. Further, the change in the incidence angle for the prism and the change in the output angle are substantially proportional to each other, so long as the change in the incidence angle is small, i.e., equal to or smaller than 10 degrees. Table 2 shows the change in the incidence angle used for sweeping the wavelength range of 700 nm to 400 nm. A change in a voltage applied to the beam deflector 12, which is required to change the incidence angle, is also shown in Table 2. The voltages applied to the beam deflector 12 can be obtained while referring to FIG. 6.

TABLE 2

| Material | Change of Incidence Angle | Range for Changing Applied Voltage |
| --- | --- | --- |
| BK7 glass | About 1.6 degrees (=28 mrad) | +55 V to −55 V |
| F2 glass | About 4.0 degrees (=70 mrad) | +80 V to −80 V |
| SF10 glass | About 7.4 degrees (=130 mrad) | +130 V to −130 V |

As is apparent from this, a trade-off relationship is established between the wavelength resolution and the applied voltage. In this embodiment, BK7 glass is employed to preferentially perform the operation at a low voltage. Furthermore, the angle of incidence angle for the prism 13 is 40 degrees that is smaller than the condition for the minimum deviation angle (49.4 degrees), so that the wavelength resolution can be equal to or lower than 40 nm near a wavelength of 700 nm. As a result, a difference in the angle of refraction is two degrees (=35 mrad), which is greater than that for the condition for obtaining the minimum deviation angle. It should be noted that the voltage applied to the beam deflector 12 at this time changes in a range between +55 and −55 V.

Second Embodiment

Figure 8:
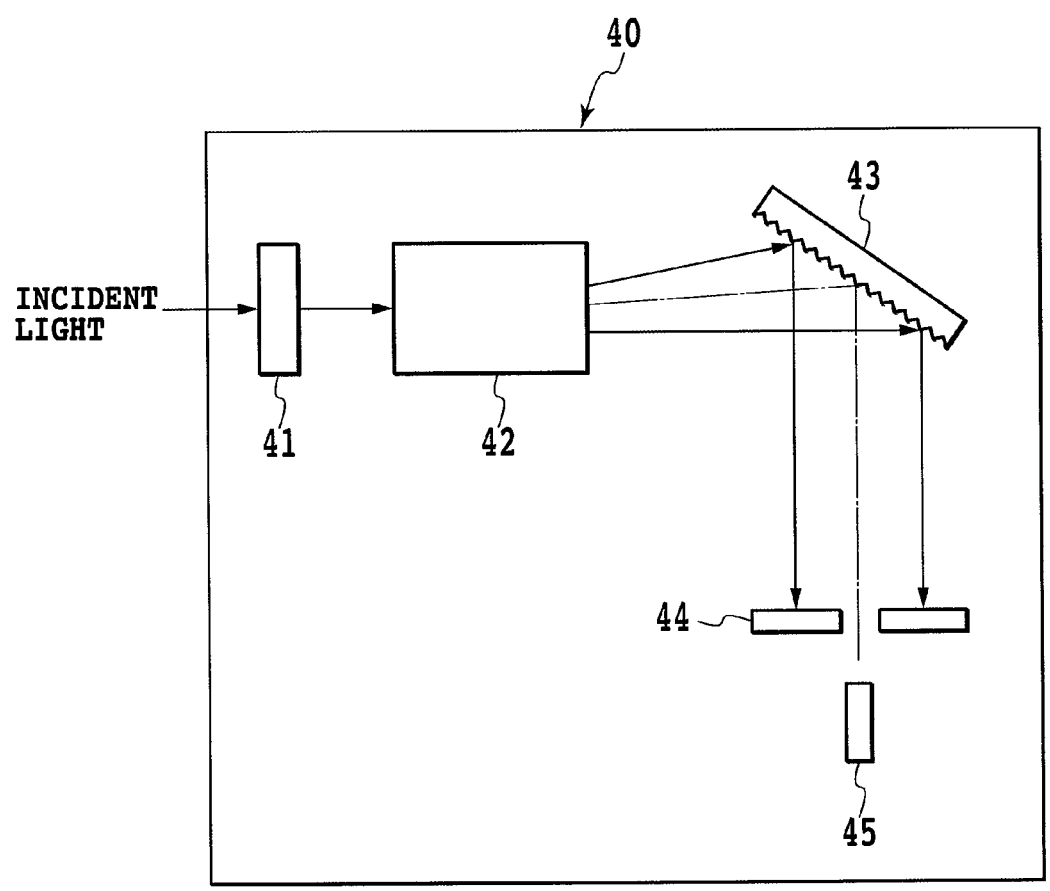
FIG. 8 is a diagram illustrating a spectroscope according to another embodiment of the present invention.

A spectroscope for a second embodiment of the present invention is shown in FIG. 8 to provide a short time response and a small-sized device. A spectroscope 40 includes a deflection plate 41, which controls the deflection of incident light, a beam deflector 42, which is formed of a crystal having an electro-optic effect, a diffraction grating 43, which serves as spectroscopic means, a slit plate 44, which serves as wavelength selection means, and a photodetector 45. In this embodiment, a diffraction grating is employed as spectroscopic means, instead of the prism used in the first embodiment.

The diffraction grating 43 is a square with 20 mm sides, and 150 grooves/mm are formed in the surface. The length of an optical path, extending from the beam deflector 42 to the diffraction grating 43, is 20 mm. However, when a diffraction grating 43 having a smaller size is employed, the length of the optical path can be shortened.

Assume that the wavelength range of incident light is 400 nm to 700 nm. The beam deflector 42, the diffraction grating 43, the slit plate 44 and the photodetector 45 are located so that upon application of a voltage of −85 V to the beam deflector 42, light is input to the diffraction grating 43 at an incidence angle of 43.5 degrees, and the diffracted light having a wavelength of 700 nm passes through the slit plate 44 and is detected by the photodetector 45. Subsequently, light output by the beam deflector 42 is dispersed, by the diffraction grating 43, in accordance with the wavelength. Thus, when a voltage applied to the beam deflector 42 is adjusted, the wavelength of the light that is permitted to pass through the slit plate 44 can be selected from the incident light.

When the voltage applied to the beam deflector 42 is changed in a range from −85 V to +85 V, the angle at which the incident light is input to the diffraction grating 43 is varied, between 43.5 degrees and 47.8 degrees. Light having a wavelength covering from 700 nm to 400 nm then passes through the slit plate 44, and is detected by the photodetector 45. At this time, only a period on the order of microseconds is required to sweep the wavelength range of from 700 nm to 400 nm.

The slit width of the slit plate is 200 μm, and the wavelength resolution depends on a beam divergence angle, the number of grooves in the diffraction grating 43, the angle of incidence for the diffraction grating 43, and the distance between the diffraction grating 43 and the slit plate 44. According to this embodiment, the beam diameter of the beam deflector 42 is 400 μm, 150 grooves/mm are provided for the diffraction grating 43, the angle of incidence for the diffraction grating 43 is 43.5 degrees, and the distance from the diffraction grating 43 to the slit plate 44 is 120 mm. In this case, the wavelength resolution is about 4.5 nm near a wavelength of 400 nm, or about 9 nm near a wavelength of 700 nm.

For a case wherein the diffraction grating is employed as spectroscopic means, as well as in a case wherein a prism is so employed, a trade-off relationship is established between the wavelength resolution and the applied voltage. When the number of grooves in the diffraction grating is increased, the wavelength resolution becomes higher; however, a range for changing a voltage, which is necessary for sweeping a required wavelength range, must also be increased. Therefore, these relationships should be taken into account to determine the number of grooves in the diffraction grating 43 and the angle of incidence for the diffraction grating 43.

As described above, according to a conventional spectroscope, either the prism or the diffraction grating, which is spectroscopic means, is rotated to change the incidence angle for the incident light, while according to the first and second embodiments, the beam deflector, which is formed of a crystal having an electro-optic effect, is employed to change the angle at which the incident light strikes the spectroscopic means. Therefore, the response time can be reduced. And furthermore, since a mechanical control system is not required, the spectroscope consumes only a small amount of power, and since a thermal control mechanism is not required, a smaller spectroscope can be provided.

Since the arrangements in the first and second embodiments provide the above described effects and superior spectroscopes, they are very useful. These arrangements become even more useful since it is possible to obtain a high resolution without increasing the deflection angle of the beam deflector 12 or 42, or to reduce the voltage that is applied to the beam deflector 12 or 42 to acquire a predetermined resolution.

Third Embodiment

In this embodiment, an explanation will be given for a spectroscope that employs a prism, as spectroscopic means (a spectroscopic medium), with which a high resolution can be obtained without increasing the deflection angle for light output by a beam deflector, which includes an electro-optic crystal having an electro-optic effect, and for which, to acquire a predetermined resolution, a voltage applied to the beam deflector can be reduced.

Figure 9:
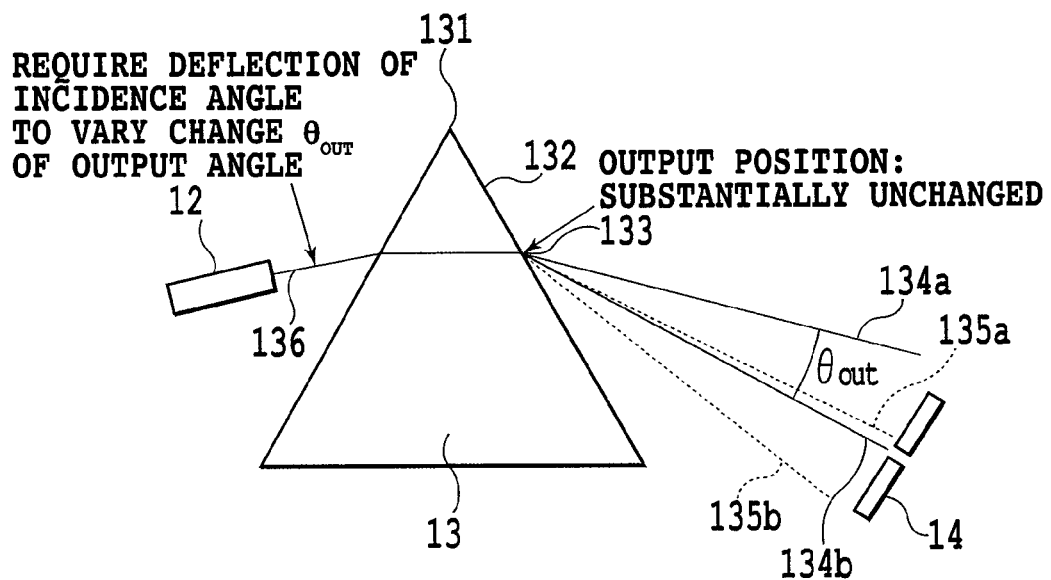
FIG. 9 is a diagram for explaining the principle of spectroscopy according to an additional embodiment of the present invention.

FIG. 9 is a diagram for explaining the principle of spectroscopy for the first embodiment.

In FIG. 9, reference numeral 131 denotes the apex of a prism 13, and reference numeral 132 denotes the output plane of the prism 13, through which the light projected by the beam deflector 12 is output. Reference numeral 134*a* denotes light (also called output light 134*a*), which is part of the light output by the prism 13 under a first voltage applied state of the beam deflector 12, that has the longest wavelength in a desired wavelength range for detection. And reference numeral 134*b* denotes light (also called output light 134*b*), which is part of the light output by the prism 13 in the first voltage applied state of the beam deflector 12, that has the shortest wavelength in the desired wavelength range. Reference numeral 135*a* denotes light (also called output light 135*a*), which is part of the light output by the prism 13 when the beam deflector 12 is in a second voltage applied state differing from the first voltage applied state, that has the longest wavelength in a desired wavelength range for detection. And reference numeral 135*b* denotes light (also called output light 135*b*), which is part of the light output by the prism 13 under the second voltage applied state of the beam deflector 12, that has the shortest wavelength in the desired wavelength range.

For the first embodiment, to provide the spectroscopic function, it is important that the wavelength of light passing through the slit plate 14 be changed in accordance with the state under which the voltage is applied to the beam deflector 12. In the first embodiment, this condition is established in the following manner. Based on light having a wavelength that passes through the slit plate 14 and is detected by the photodetector 15, the individual voltage applied states of the beam deflector 12 are adjusted to control the deflection angle of light output by the beam deflector, and the angle at which light from the beam deflector 12 enters the prism 134 is changed. Since light having a shorter wavelength is refracted more by wavelength dispersion at the output plane 132, refraction at the output plane 132 for light having a long wavelength in a desired wavelength range to be detected should be greater than that for light having a short wavelength. In the first embodiment, the angle of incidence is controlled by the deflection of light that is output by the beam deflector 12, and the voltage applied state of the beam deflector 12 is controlled so that refraction at the output plane 132 for light detected that has a short wavelength is greater than that for light having a long wavelength. That is, a voltage applied state is designated for deflecting the angle at which the incident light 136 enters the prism 13, so that a change Bout varies for the output angle that is formed by the optical axes of light beams, output at the output plane 132, that have the longest wavelength and the shortest wavelength in a desired wavelength range to be detected.

The voltage applied state of the beam deflector 12 indicates the level of a voltage (the strength of an electric field that is formed) that is applied to the KTN crystal 21 using the electrodes 22 and 23, and includes the state in which a voltage is not applied. Especially, the first voltage applied state is the state in which light having the shortest wavelength in a desired wavelength range for detection passes through the slit in the slit plate 14. Needless to say, an appropriate voltage applied state must be prepared for the detection of light having a wavelength lying between the longest and the shortest wavelengths in the desired wavelength range for detection.

The deflection direction for light from the beam deflector 12 that enters the prism 13 is changed in accordance with the voltage applied state of the beam deflector 12. However, for simplification of the drawing in FIG. 9, the input light is shown as light having a predetermined direction (input light 136), regardless of the application of a voltage to the beam deflector 12.

In the first embodiment, the length of the example optical path from the beam deflector 12 to the prism 13 is 20 mm. In this case, when the input light 136 has entered the prism 13 from the beam deflector 12, there is virtually no change in the input position on the incidence plane of the prism 13, whether the beam deflector 12 is in the first voltage applied state (corresponding to when light having the longest wavelength is detected in a desired wavelength range) or in the second voltage applied state (corresponding to when light having the longest wavelength is detected in the desired wavelength range). Therefore, in both the first voltage applied state and the second voltage applied state, light that enters and passes through the prism 13 is output at almost the same output position 133.

In this case, to improve resolution, a prism 13 having a high dispersion factor is required, and the deflection angle of the beam deflector 12 must be increased. To obtain a greater deflection angle, a voltage applied to the beam deflector 12 must be increased.

That is, since the output position of the prism 13 is almost unchanged for the detection of both a short wavelength and a long wavelength, the refraction of light output at the output plane 132 must be increased to detect light having a long wavelength. In other words, the deflection angle of the input light 136, which is projected from the beam deflector 12, must be increased, so that in the first voltage applied state, the light 134*b* having the shortest wavelength in the desired wavelength range for detection can pass through the slit in the slit plate 14, and in the second voltage applied state, the light 136 having the longest wavelength in the desired wavelength range can pass through the slit in the slit plate 14. Therefore, the level of a voltage applied to the beam deflector 12 must be increased to establish the second voltage applied state.

Specifically, performance at a high resolution indicates that light output by the spectroscopic means, such as a prism, is dispersed at a large angle in a wavelength range for detection. That is, an increase of the resolution can be provided by increasing an angle formed by the optical axis of the output light 134*a* and the optical axis of the output light 134*b* in FIG. 9. At this time, for the detection of the entire desired wavelength range (wavelength range between the output light 134a and the output light 134b), the output angle of light should be changed by increasing the change in the deflection angle of the beam deflector 12, so that light across the entire wavelength range for detection can enter the slit of the slit plate 14. This is why, as described above, the voltage applied to the beam deflector 12 should be increased.

In this embodiment, in order to obtain a high resolution without increasing a voltage applied to the beam deflector 12, the beam deflector 12 and the prism 13 are located at a distance from each other, i.e., the optical path from the beam deflector 12 to the prism 13 is extended. With this arrangement, for light having a long wavelength that is to be detected, the output position on the output plane 132 is shifted away from the output position, on the output plane 132, for light having a short wavelength that is to be detected.

Figure 10:
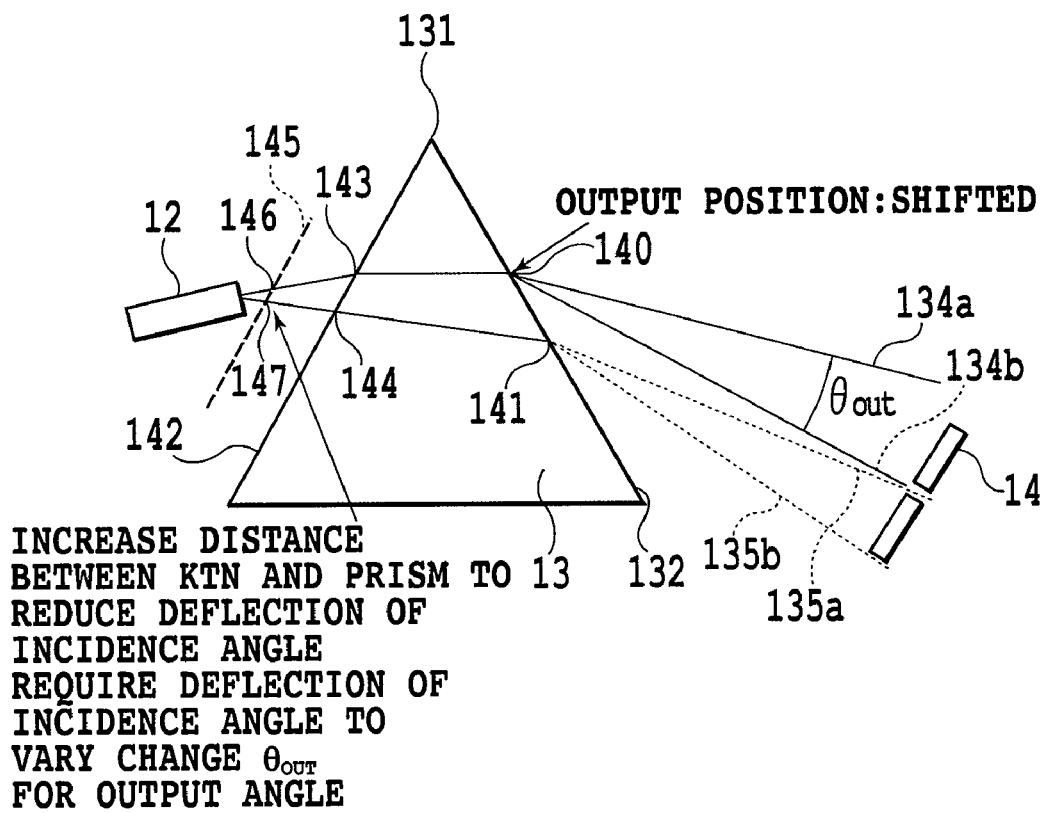
FIG. 10 is a diagram for explaining the principle of spectroscopy according to the embodiment of the present invention.

FIG. 10 is a diagram for explaining the principle of spectroscopy according to this embodiment.

In FIG. 10, reference numeral 140 denotes the output position of light on the output plane 132 while the beam deflector 12 is in the first voltage applied state. Reference numeral 141 denotes the output position of light on the output plane 132 while the beam deflector 12 is in the second voltage applied state. Reference numeral 142 denotes the incidence plane of the prism 13 for the arrangement wherein, in the structure in FIG. 9 (for a case wherein the optical path length between the beam deflector 12 and the prism 13 is 20 mm), the optical path between the beam deflector 12 and the prism 13 has an extended length (for a case wherein the length of the optical path from the beam deflector 12 to the prism 13 is 500 mm). Reference numeral 143 denotes the position on the incidence plane 142, at which light enters from the beam deflector 12 while in the first voltage applied state, and reference numeral 144 denotes the position on the incidence plane 142, at which light enters from the beam deflector while in the second voltage applied state.

Reference numeral 145 denotes a virtual plane, which is the incidence plane of the prism 13 for light that enters from the beam deflector 12, assuming that the prism 13 is located at a distance of 20 mm from the beam deflector 12, as arranged in FIG. 10 (i.e., the arrangement in FIG. 9 is employed). Reference numeral 146 denotes the position, on the virtual incidence plane 145, at which light, from the beam deflector 12, enters in the first voltage applied state, and reference numeral 147 denotes the position on the virtual incidence plane 145 at which, based on the same assumption, light enters from the beam deflector 12 while in the second voltage applied state.

According to the first embodiment shown in FIG. 9, since the distance between beam deflector 12 and the incidence plane 145 of the prism 13 is short, i.e., only 20 mm, the input position 146 for the first voltage applied state and the input position 147 for the second voltage applied state are not far from each other. Therefore, as shown in FIG. 9, the output position on the prism 13 is not shifted, substantially, between the first voltage applied state and the second voltage applied state.

On the other hand, when the beam deflector 12 and the prism 13 are arranged at a distance as shown in FIG. 10, the optical path from the beam deflector 12 to the prism 13 is extended, and as a result, the input position 143 for the first voltage applied state and the input position 144 for the second voltage applied state are located at a distance from each other. That is, the input position 144 on the incidence plane 142 in the second voltage applied state is shifted away from the input position 143 on the incidence plane 142 in the first voltage applied state.

Therefore, as shown in FIG. 10, when light is projected by the beam deflector 12 in the first voltage applied state, the light that enters the prism 13 at the input position 143, on the incidence plane 142, is propagated through the prism 13, and is output at the output position 140 on the output plane 132. Further, when light is output from the beam deflector 12 in the second voltage applied state, the light enters the prism 13 on the incidence plane 142 at the input position 144, which is shifted from the input position 143. The input light is propagated through the prism 13, and is output on the output plane 132 at the output position 141 that is shifted from the output position 140. The distance at this time between the output position 140 and the output position 141 is 6 mm, and the two output positions are appropriately shifted.

As described above, in this embodiment, the optical path from the beam deflector 12 to the prism 13 is extended, for example, by increasing a distance between the beam deflector 12 and the prism 13, and the position at which light enters the prism 13 is shifted in accordance with the voltage applied state of the beam deflector 12. As a result, the position at which light is output from the prism 13 can be shifted.

In this embodiment, since the output position is shifted in this manner, a high resolution is still available when a low voltage is applied to the beam deflector. The reason for this will be described below.

In the first embodiment, as shown in FIG. 9, only the output angle of the prism 13 is employed to control the input wavelength for the slit plate 14, while in this embodiment, both the output angle and the output position of the prism 13 are employed to control the input wavelength for the slit 14. According to this embodiment, when the output position is shifted from the position 140 to the position 141, as shown in FIG. 10, this encourages the change in wavelength to be detected, based on the change in the output angle. Therefore, when the same material is employed for a prism as a dispersion medium, the required deflection angle of the beam deflector 12 is smaller in the arrangement in FIG. 10 than in the arrangement in FIG. 9, i.e., the level of voltage can be reduced. Further, to obtain a high resolution using the structure, as in FIG. 9, wherein the output position is substantially unchanged, a high-dispersion prism should be employed to increase the change in the output angle, and the change in the deflection angle that determines the change in the output angle. On the other hand, with the structure in FIG. 10 for this embodiment, since shifting of the output position increases the change in the input wavelength for the slit plate 14, only smaller changes than those above are required for the output angle and the deflection angle. In other words, only a low voltage is required to obtain a high resolution.

Specifically, the beam deflector 12, which includes an electro-optic crystal, such as KTN, having an electro-optic effect, and the prism 13, which serves as spectroscopic means, are arranged at a distance equivalent to a predetermined optical path length, or longer. When the first voltage applied state is changed to the second voltage applied state, a shift in the output position at which light is output by the prism 13 (a distance between the output position 140 and the output position 141; an output shift distance) can be greater than a shift in the input position at which the light enters the prism 13 (the distance between the input position 143 and the input position 144; the input shift distance). Because of the effect that the change in the input wavelength for the slit plate 14 is increased by extending the output shift distance, the resolution can be improved without increasing the deflection angle of the beam deflector 12. Therefore, the improvement in resolution using a low drive voltage is enabled.

As described above, it is important for this embodiment that the optical path between the beam deflector 12 and the prism 13 be designated to have an equal to or greater length than a length such that the output shift distance is increased. In a case wherein there is almost no output shift distance, as is described above, the output position is substantially unchanged, between the first voltage applied state and the second voltage applied state. As a result, for the dispersed light components, angles are distributed at almost the same output position on the output plane of the prism 13, so that a long wavelength and a short wavelength in a desired wavelength range for detection. Therefore, to improve the resolution, a higher voltage must be applied to the beam deflector 12.

On the other hand, the essence of this embodiment is that the output position (the output position 140 in FIG. 10) for the detection of a short wavelength in a desired wavelength range) should differ from the output position (the output position 141 in FIG. 10) for the detection of a long wavelength in the desired wavelength range, i.e., the output position should be shifted. When the output shift distance is considerably greater than the input shift distance, the output position can be greatly shifted. That is, when the optical path between the beam deflector 12 and the prism 13 is extended, the output position on the prism 13 is greatly shifted. When a specified length or longer is designated for the optical path between the beam deflector 12 and the prism 13, the output position for the detection of a short wavelength in the desired wavelength range can be appropriately separated from the output position for the detection of a long wavelength in this wavelength range. This length refers to the predetermined optical path length previously described.

As described above, the essence of this embodiment is that the beam deflector 12 and the prism 13 are arranged at a distance equivalent to a predetermined optical path length or longer. In addition to this, it is preferable that, since the present invention relates to a spectroscope, light having all the wavelengths in a targeted wavelength range (a desired wavelength range) be detected. For such detection, it is important that light deflection performed by the beam deflector 12 be controlled to enable the detection of light having the longest wavelength and the shortest wavelength in the desired wavelength range. That is, it is important that, in the first voltage applied state, the output light 134b that is output at the output position 140 and has the shortest wavelength in the desired wavelength range be allowed to enter the slit in the slit plate 14, and that in the second voltage applied state, the output light 135a that is output at the output position 141 and has the longest wavelength in the desired wavelength range be allowed to enter the slit in the slit plate 14.

Figure 11:
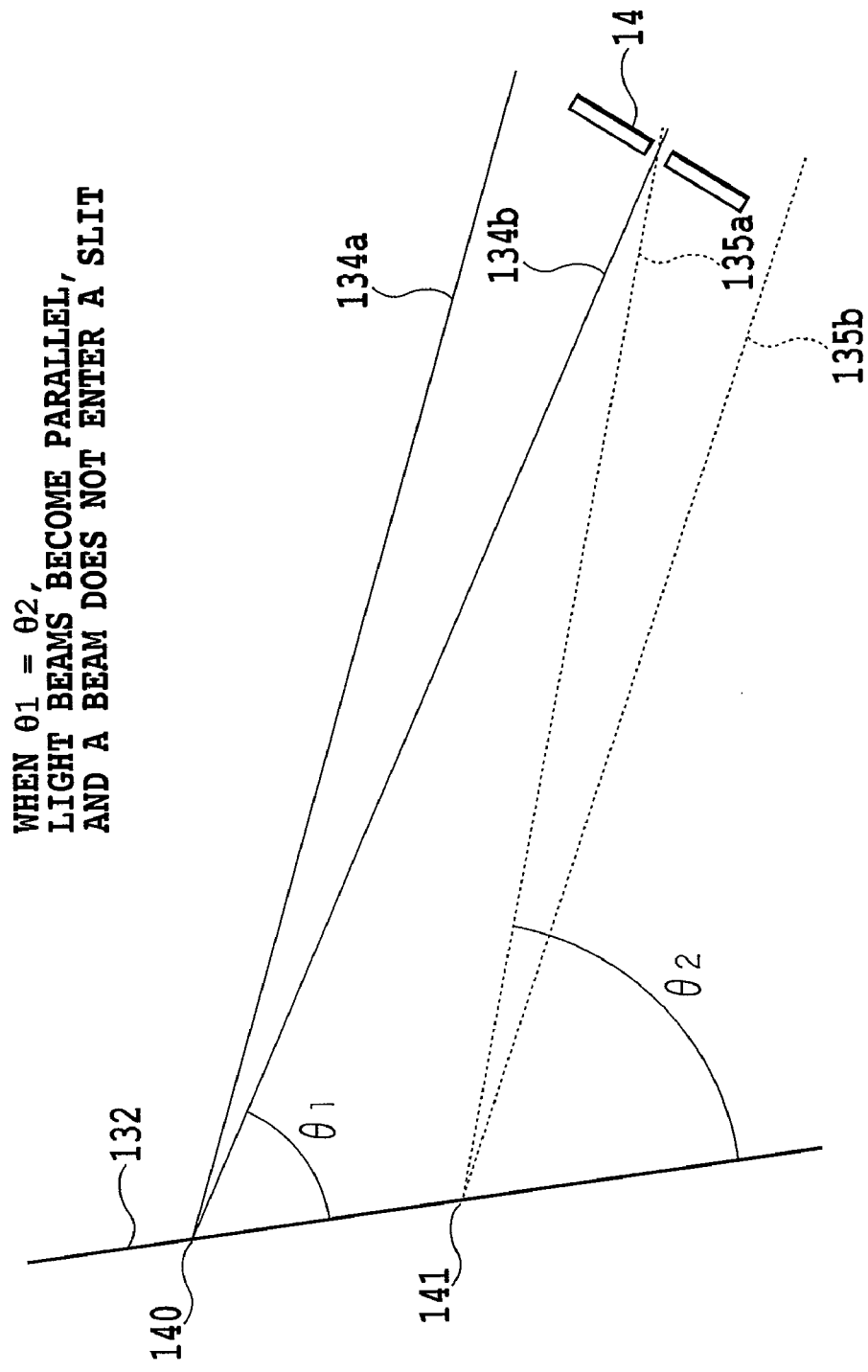
FIG. 11 is a diagram for explaining a condition required, for the embodiment of the present invention, for the detection of light having a wavelength in a desired wavelength range.

FIG. 11 is a diagram for explaining a condition, according to the embodiment, required to enable the detection of light having a wavelength in a desired wavelength range for detection.

In FIG. 11, $\theta 1$ denotes an angle (also called an output angle $\theta 1$) formed, relative to the output plane 132 of the prism 13, by the optical axis of the output light 134b that is output on the output plane 132 in a case (first voltage applied state) wherein a voltage was applied to the beam deflector 12 for the detection of light having the shortest wavelength in a desired wavelength range. $\theta 2$ denotes an angle (also called an output angle $\theta 2$) formed, relative to the output plane 132 of the prism 13, by the optical axis of the output light 135a that is output on the output plane 132 in a case (a second voltage applied state) wherein a voltage was applied to the beam deflector 12 for the detection of light having the longest wavelength in the desired wavelength range.

In this embodiment, the output position on the output plane 132 of the prism 13 differs (is shifted) in accordance with the angle of deflection of light output by the beam deflector 12. The output position 141 of the output light 135a is shifted from the output position 140 of the output light 134b, and when the output angle $\theta 1$ is equal to the output angle $\theta 2$, i.e., when the output light 134b and the output light 135a are parallel to each other, the output light 135a, which is light having the longest wavelength in the desired wavelength range for detection, can not enter the slit in the slit plate 14. As a result, the light having the longest wavelength in the desired wavelength range can not be detected, and the detection of light in the desired wavelength range is not enabled.

Therefore, in this embodiment, to enable the detection of all of the wavelengths in the desired wavelength range, the output position is shifted between the first voltage applied state and the second voltage applied state to establish a condition $\theta 1 < \theta 2$, so that light having the longest wavelength and the shortest wavelength in a desired wavelength range can be detected. At this time, it is preferable that $\theta 2$ be as great as possible while $\theta 1 < \theta 2$ is satisfied.

$\theta 1$ and $\theta 2$ are determined based on the length of the optical path, extended either between the beam deflector 12 and the prism 13 or in the prism, and a voltage applied to the KTN crystal 21 (the beam deflector 12). Therefore, in this embodiment, the first voltage applied state and the second voltage applied state are designated in accordance with the optical path length between the output position of the beam deflector 12 and the output position of the prism 13, so that a condition $\theta 1 < \theta 2$ is established.

Since it is important, for this embodiment, that the output position of the prism 13 be shifted based on the voltage applied state of the beam deflector 12, the beam deflector 12 is located at a distance from the prism 13, so that the input position for the prism 13 can be shifted based on the voltage applied state. From the viewpoint of the improvement of the resolution, the essential point is the extension of the optical path length between the beam deflector 12 and the prism 13, not the increase in the distance between the beam deflector 12 and the prism 13. That is, the essential point is not limited to a mode in which the distance between the beam deflector 12 and the prism 13 is physically extended.

For example, at least one mirror may be arranged between the beam deflector 12 and the prism 13, and light output by the beam deflector 12 may pass the mirror to enter the prism 13. An optical system employing a lens may also be employed. With this arrangement, a long optical path is obtained between the beam deflector 12 and the prism 13, although the beam deflector 12 and the prism 13 are physically located close to each other. Therefore, the size of the device can be reduced while extending the optical path from the beam deflector 12 to the prism 13.

Furthermore, in this embodiment, so long as the optical path from the output position of the beam deflector 12 to the output position of the prism 13 can be extended, the output position of the prism 13 described above can be shifted. Therefore, when a large prism is employed instead of extending the optical path between the beam deflector 12 and the prism 13, the optical path length between the output position of the beam deflector 12 and the output position of the prism 13 can also be increased.

In this embodiment, when a long optical path is designated between the beam deflector 12 and the prism 13 to increase resolution, so long as the condition $\theta 1 < \theta 2$ is established, light having the longest wavelength and light having the shortest wavelength in a desired wavelength range can be detected, and the detection of light for all the wavelengths in the desired wavelength range is enabled.

It is important for this embodiment that the optical path from the beam deflector 12 to the prism 13 be extended and/or the size of the prism 13 be increased, in order to appropriately shift the output position of the prism 13 in the first voltage applied state and in the second voltage applied state. However, there is a case wherein, when the beam deflector 12 is fixed at a predetermined location, the photodetector 15 can not detect all of the light in the desired wavelength range simply by increasing the length of the optical path.

Therefore, one of the objectives of this embodiment is that the output position of the prism 13 be greatly changed for the detection of a long wavelength in a desired wavelength range and for the detection of a short wavelength in this wavelength range, and when the device functions as a spectroscope, it is important that both light having the longest wavelength and light having the shortest wavelength in the desired wavelength range should pass through the slit of the slit plate 14. That is, in this embodiment, it is important that light having the longest wavelength and light having the shortest wavelength in the desired wavelength range can be appropriately detected, regardless of whether, to improve the resolution, the optical path length between the beam deflector 12 and the prism 13 is increased, or a large prism is employed to extend the optical path for light that passes through the prism. Therefore, in this embodiment, based on the device structure that is provided, a voltage to be applied to the beam deflector 12 is designated to satisfy the condition $\theta 1 < \theta 2$.

In other words, so long as the structure is designed to satisfy the condition $\theta 1 < \theta 2$, light having the longest wavelength and light having the shortest wavelength in a desired wavelength range can be appropriately detected, regardless of the optical path length between the beam deflector 12 and the prism 13 or the size of the prism, and in order to provide a high resolution, a long optical path can be designated between the beam deflector 12 and the prism 13, or a large prism 13 can be employed.

As described above, according to the embodiment, since a high resolution can be obtained without increasing the deflection angle of light output by the beam deflector 12, a large voltage is not required to be applied to the beam deflector 12 to provide a high resolution. That is, assuming that the same voltage is applied to the beam deflector 12 in this embodiment and to the beam deflector 12 in the first embodiment, a higher resolution can be obtained in this embodiment than in the first embodiment.

Further, since the deflection angle of the beam deflector 12 can be reduced without degrading the wavelength resolution, for providing the same resolution a voltage applied to the beam deflector 12 in this embodiment can be lower than the voltage in the first embodiment.

Since a voltage level can be lowered for the application to the electro-optic crystal (the KTN crystal 21) used in the beam deflector 12, power consumption can be reduced.

Example

In this example, BK7 glass was employed as the prism 13 whose apex is 60°. Furthermore, a KTN crystal 21, 5 mm long and 0.5 mm thick, having a refractive index of 2.2 and $s_{11}$ of $1.0 \times 10^{14}$ m$^2$/V$^2$ was employed for the beam deflector 12. The distance from the input position 143 to the apex 131 was 10 mm, and the distance from the output position to the slit plate 14 was 130 mm. A wavelength range of from 400 nm to 700 nm was to be detected for this example.

The input positions (the input positions 143 and 144) for the prism 13 and the output positions (the output positions 140 and 141) for the prism 13 are determined based on a distance (an optical path length difference) L from the beam deflector 12 to the prism 13 and on the deflection angle of the beam deflector 12.

Referring to FIG. 10, when P1 denotes a distance between the apex 131 and the input position 143, and φ denotes a deflection angle required to shift a position from the input position 143 to the input position 144, i.e., the deflection angle in the second voltage applied state, a distance P2 from the apex 131 to the input position 144 is represented by:

$$P2 = P1 + L(\sin\theta_3 - \cos\theta_3 \cdot \tan(\theta_3 - \phi))$$  Expression (1).

In this expression, $\theta_3$ is an angle at which the light output by the beam deflector 12 enters the prism at the input position 143 (an angle formed by the optical axis of light that enters the prism 13 and the incidence plane 142).

When F1 denotes a distance from the apex 131 to the output position 140, β denotes the apex 131 and n denotes the refractive index of the prism 13, F1 is represented by:

$$F1 = P1 \cos\beta + P1 \tan(\beta - \sin^{-1}(1/n \cdot \sin\theta))\sin\beta$$  Expression (2).

Similarly, when F2 denotes a distance from the apex 131 to the output position 141, F2 is represented by:

$$F2 = P2 \cos\beta + P2 \tan(\beta - \sin^{-1}(1/n \cdot \sin(\theta_3 - \phi)))\sin\beta$$  Expression (3).

Figure 12:
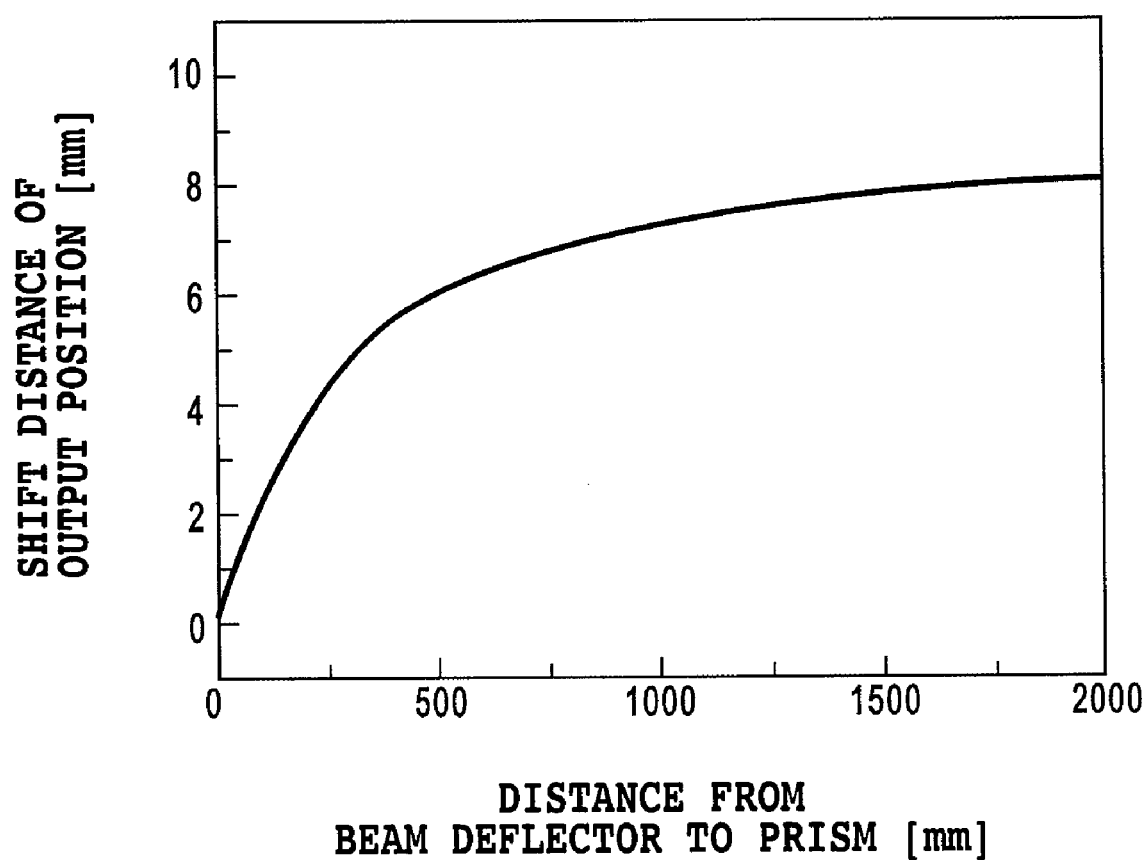
FIG. 12 is a graph showing a relationship, for an example of the present invention, between a shift in the output position of the prism, obtained by comparing those in the first voltage applied state and the second voltage applied state, and a distance from the beam deflector to the prism.

FIG. 12 is a graph showing a relationship that was established, under the conditions represented in expressions (1) to (3), for a case wherein light was deflected by the beam deflector to detect the entire desired wavelength range, between a shift distance (F2−F1) for the output positions for the prism 13 in the first voltage applied state and in the second voltage applied state, and the distance L from the beam deflector 12 to the prism 13.

As is apparent from FIG. 12, when the length of the optical path from the beam deflector 12 to the prism 13 is extended, the shift distance, from the output position 140 in the first voltage applied state to the output position 141 in the second voltage applied state, is increased.

In this embodiment, the deflection angle φ is a deflection angle at which the beam deflector 12 is set in the second voltage applied state, i.e., a deflection angle required for performing spectroscopy to obtain light having the longest wavelength in the desired wavelength range. Therefore, when a low voltage (e.g., $V_\alpha$) is set for the second voltage applied state to operate at a low drive voltage, simply a predetermined value need be designated for the shift distance between the output positions to obtain a satisfactorily high resolution. Then, an appropriate distance (optical path length difference) L can be obtained employing expressions (1) to (3). In other words, when the difference in the length of the optical path between the beam deflector 12 and the prism 13 is set for the above described appropriate distance (optical path length difference) that satisfies the predetermined shift distance for the output position=F1−F2, and when the second voltage applied state is set to $V_\alpha$, the output position for the prism 13 in the second voltage applied state is appropriately shifted from the other output position, and a high resolution can be provided by operating at a low drive voltage.

As shown in FIG. 12, for example, within the range 0 to 500 mm for the distance (optical path length difference) L from the beam deflector 12 to the prism 13, the relationship "F1−F2=predetermined output position shift distance" is employed and the shift distance for the output position can be extended in association with the increase in the distance L, and a high resolution can be output at a low drive voltage. A shorter distance L is preferable while taking downsizing of the device into account; however, when the device is designed based on the above described relationship, only a little extension is required for the distance L, in the range 0 to 500 mm, to obtain a long output position shift distance.

In addition, when the relationship "F1−F2=predetermined output position shift distance" is employed, the distance L can be obtained to provide the output position shift distance required for a desired resolution. Therefore, the distance (optical path length difference) L between the beam deflector 12 and the prism 13 can be set to the optimal distance to obtain the desired resolution.

As shown in FIG. 12, when the optical path between the beam deflector 12 and the prism 13 is 500 mm or greater, the shift distance between the output positions is a large value, about 6 mm, which is substantially a fixed value. Therefore, from the viewpoint of this embodiment for increasing the output position shift distance to provide a high resolution at a low drive voltage, 500 mm or longer is preferable for the optical path between the beam deflector 12 and the prism 13.

Figure 13:
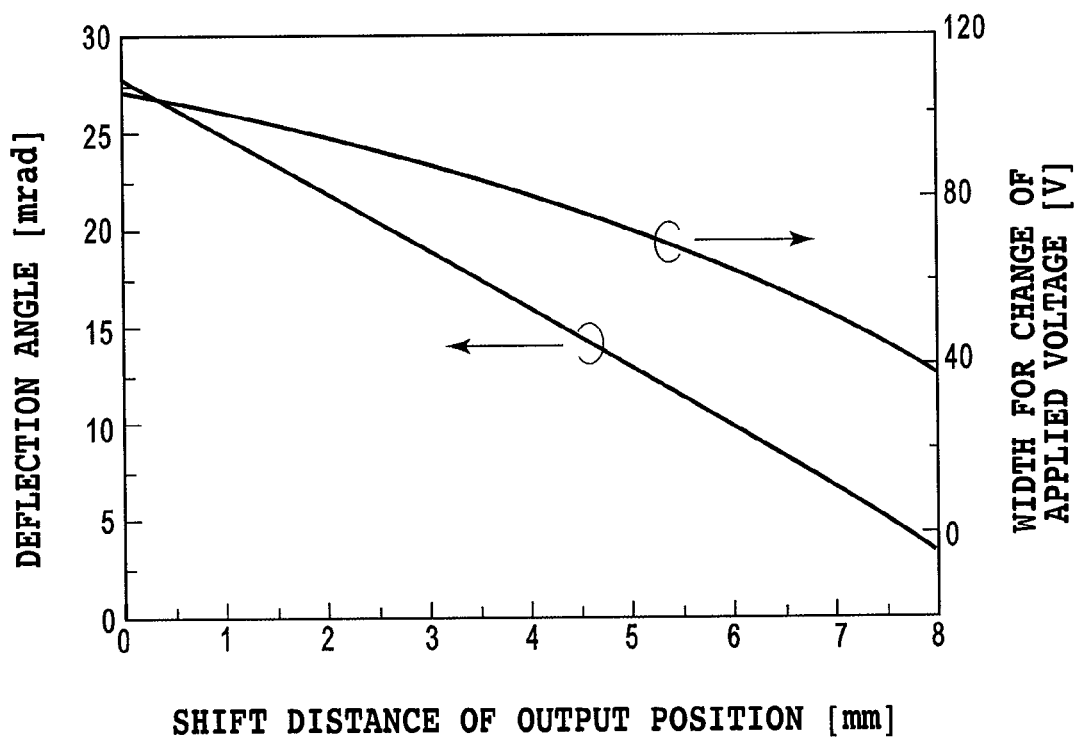
FIG. 13 is a graph showing a relationship, for the example of the present invention, between a shift in the output position for the prism, obtained by comparing the one in the first voltage applied state and the one in the second voltage applied state, the deflection angle of the beam deflector, and a voltage applied to the beam deflector.

The shift distance for the output position is determined based on the length of the optical path between the beam deflector and the prism and the deflection angle of the beam deflector. The deflection angle of the beam deflector is shown in FIG. 13, in correlation with the output position shift distance. This deflection angle indicates the deflection angle for the beam deflector required to detect a wavelength within a range of 400 nm to 700 nm. The distance between the beam deflector and the prism for the individual output position shift distance is as shown in FIG. 12. The width for the change in an applied voltage is a difference between a voltage applied to detect a wavelength of 400 nm and a voltage applied to detect a wavelength of 700 nm.

As shown in Table 2, for a case wherein the output position is not shifted, the deflection angle of the beam deflector is 28 mrad and the voltage applied is changed within the range of from +55 V to −55 V, and referring to FIG. 13, 110 V is a difference between the voltage applied for detection of a wavelength of 400 nm and the voltage applied for detection of a wavelength of 700 nm. Further, according to this embodiment, when the distance (length of the optical path) between the beam deflector and the prism is 500 mm, 6 mm is obtained as the shift distance for the output position, and at this time, the deflection angle of 10 mrad is required for the beam deflector. To acquire this deflection angle, a difference between the applied voltages is only 64 V, and a range only of from +32 V to −32 V is required to change the voltage applied. That is, only about 58% of a voltage need be applied, compared with when almost no shift appears in the output position (first basic arrangement). When the shift distance for the output position is increased, the effect produced by lowering the voltage applied becomes more noticeable.

Furthermore, the effect in this embodiment is made more noticeable by dividing a voltage applied to the beam deflector 12 into two voltages: a DC voltage (bias voltage) used to determine the center of operating points, and an AC voltage used to control the wavelength of light that enters the slit of the slit plate 14.

The deflection angle of the beam deflector that includes an electro-optic crystal, such as KTN or KLTN, is proportional to the square of the applied voltage, and when a change in the applied voltage is within the same range, the deflection angle is changed more greatly for a high voltage. For example, when a DC voltage (a bias voltage) for determining the center for the operating points is 240 V, the range for the voltage change required to detect wavelengths of 400 nm to 700 nm is as shown in Table 3.

TABLE 3

| | Range for Changing Applied Voltage |
|---|---|
| First Embodiment (bias voltage + AC voltage) | +237 V to +242 V |
| First Basic Arrangement (bias voltage + AC voltage) | +233 V to +246 V |

As is apparent from Table 3, when a bias voltage is employed, the amplitude of an AC voltage used to control the input wavelength for the slit is 38% of that in the first basic arrangement, and the effect in this embodiment is more noticeable than that obtained when a bias voltage is not employed.

Fourth Embodiment

In this embodiment, an explanation will be given for a spectroscope which employs a diffraction grating as spectroscopic means (a spectroscopic medium) and for which a high resolution can be obtained without increasing the deflection angle of light output by a beam deflector that includes an electro-optic crystal having an electro-optic effect, and for which a voltage to be applied to the beam deflector can be lowered to acquire a predetermined resolution.

Also for this embodiment, it is important that the position at which light is output from a diffraction grating 43 be shifted, so that a high resolution can be obtained without increasing the deflection angle of light output by the beam deflector, and a voltage applied to the beam deflector can be lowered in order to obtain a predetermined resolution. For this reason, the length of the optical path between a beam deflector 42 and the diffraction grating 43 is increased. At this time, it is important that light having the longest wavelength and light having the shortest wavelength in a desired wavelength range can be detected to enable the detection of light having wavelengths in the entire desired wavelength range.

In this embodiment, since the diffraction grating 43 is employed as spectroscopic means, the input position and the output position of the diffraction grating 43 are identical for light having a specific wavelength.

Figure 14:
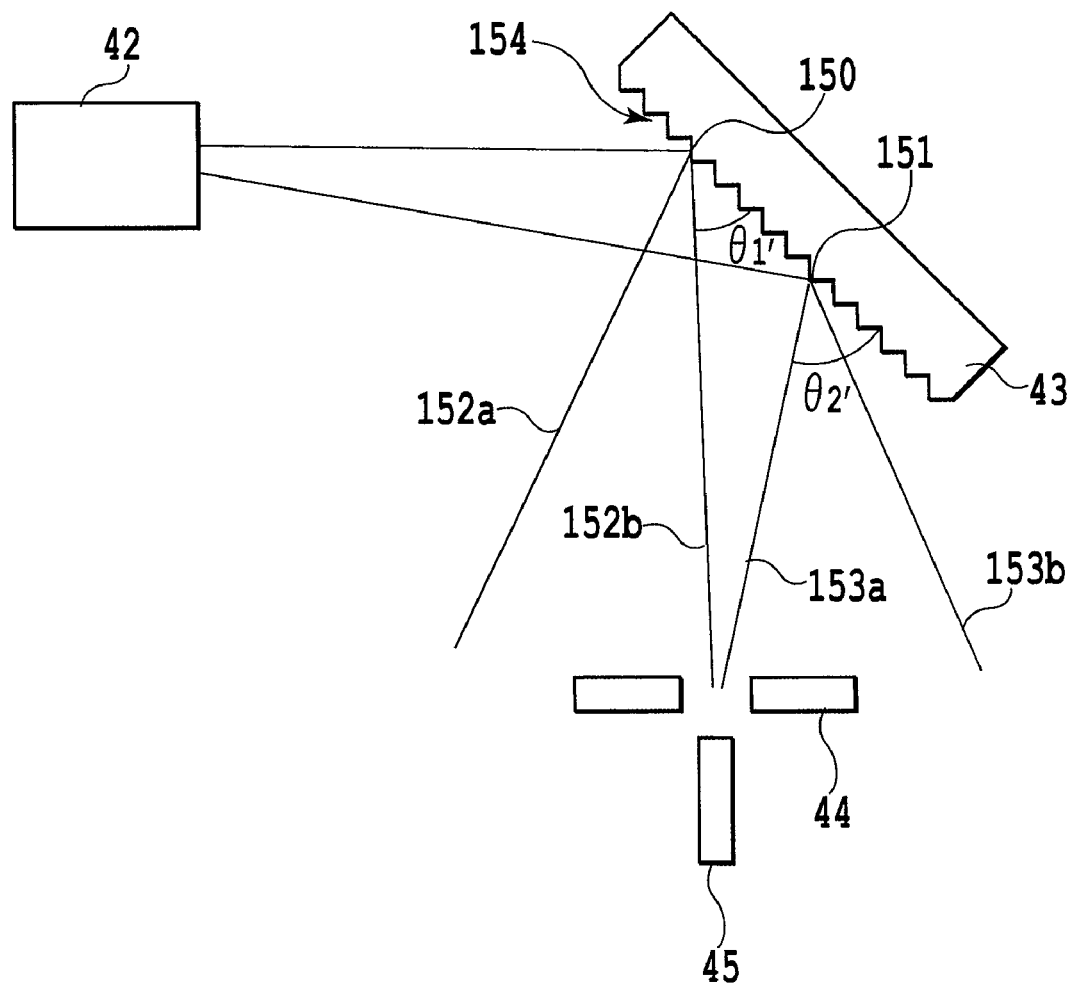
FIG. 14 is a diagram for explaining a condition required, for the embodiment of the present invention, for the detection of light having a wavelength in a desired wavelength range.

FIG. 14 is a diagram for explaining a condition for this embodiment than enables the detection of light having a wavelength in a desired wavelength range.

In FIG. 14, reference numeral 150 denotes a position at which light is output from an output surface 154 of the diffraction grating 43, for a case wherein the beam deflector 42 is in a third voltage applied state, and reference numeral 151 denotes a position at which light is output on the output surface 154, for a case wherein the beam deflector 42 is in a fourth voltage applied state.

In this embodiment, the third voltage applied state indicates the voltage applied state in which light having the longest wavelength in a desired wavelength range is allowed to pass through the slit in a slit plate 44. Also, the fourth voltage applied state indicates the voltage applied state in which light having the shortest wavelength in the desired wavelength range is allowed to pass through the slit in the slit plate 44.

Reference numeral 152a denotes light (also called output light 152a) that is included in light output by the diffraction grating 43 when it is in the third voltage applied state, and that has the shortest wavelength, in the desired wavelength range for detection. Reference numeral 152b denotes light (also called output light 152b) that is included in light output by the diffraction grating 43 when it is in the third voltage applied state, and that has the longest wavelength in the desired wavelength range for detection. Reference numeral 153*a* denotes light (also called output light 153*a*) that is included in light output by the diffraction grating 43 when it is in the fourth voltage applied state, and that has the shortest wavelength in the desired wavelength range for detection. Reference numeral 153*b* denotes light (also called output light 153*b*) that is included in light output by the diffraction grating 43 when it is in the fourth voltage applied state, and that has the longest wavelength in the desired wavelength range for detection.

Furthermore, reference symbol θ1' denotes an angle (also called an output angle θ1') that is formed, relative to the output surface 154 of the diffraction grating 43, by the optical axis of the output light 152*b* diffracted on the output surface 154 in the state (the third voltage applied state) wherein a voltage is applied to the diffraction grating 43 for the detection of light having the longest wavelength in a desired wavelength range. Reference symbol θ2' denotes an angle (also called an output angle θ2') that is formed by, relative to the output surface 154 of the diffraction grating 43, the optical axis of the output light 153*a* diffracted on the output surface 154 in the state (the fourth voltage applied state) wherein a voltage is applied to the diffraction grating 43 for the detection of light having the shortest wavelength in the desired wavelength range.

In this embodiment, as is apparent by also referring to FIG. 14, the beam deflector 42 is set to the third voltage applied state for the detection of light having the shortest wavelength in the desired wavelength range for detection, and light output by the beam deflector 42 enters the output position 150. Then, the input light is dispersed at the output position 150, and light beams having individual frequencies that are diffracted from the output position 150 in consonance with their wavelengths. As a result, the output light 152 having the longest wavelength in the desired wavelength range enters the slit in the slit plate 44, and is detected by a photodetector 45.

When the beam deflector 42 is set to the fourth voltage applied state for the detection of light having the shortest wavelength in the desired wavelength range for detection, light output by the beam deflector 42 enters the diffraction grating 43 at the output position 151, which is shifted away from the output position 150. Therefore, in the fourth voltage applied state, dispersed light is output at the output position 151 that is different from that in the third voltage applied state. In this case, the output light 153*a* having the shortest wavelength in the desired wavelength range enters the slit of the slit plate 44, and is detected by the photodetector 45.

Since the output position of the diffraction grating 43 is shifted in this manner, a high resolution can be provided, without increasing the deflection angle of light output by the beam deflector 42, as in the third embodiment.

However, in this embodiment as well as in the third embodiment, when the output light 152*b* in the third voltage applied state is parallel to the output light 153*a* in the fourth voltage applied state, the output light 153*a* can not enter the slit in the slit plate 44. Therefore, also in this embodiment, the length of the optical path between the output position of the beam deflector 42 and the output position of the diffraction grating 43 is employed to set the third voltage applied state and the fourth voltage applied state, so that a condition θ1'<θ2' is established. At this time, it is preferable that θ2' be as great as possible while θ1'<θ2' is satisfied.

When the states are set in this manner, light having wavelengths within the entire desired wavelength range can be detected, regardless of whether the optical path between the beam deflector 42 to the diffraction grating 43 is extended to obtain a high resolution.

In the third embodiment or the fourth embodiment, a description has been given for a case in which the state in which a voltage is applied to the beam deflector is changed from the first voltage state to the second voltage state, or from the third voltage applied state to the fourth voltage applied state. However, changing the states is not limited to this. For example, the state in which a voltage is applied to the beam deflector may be changed from the second voltage applied state to the first voltage applied state, or from the fourth voltage applied state to the third voltage applied state.

Fifth Embodiment

The objective of this embodiment is simultaneous performance of high-resolution measurement and wideband measurement in one operation, in addition to reducing the time response and downsizing a device.

To obtain a high resolution for a spectroscope, chromatic dispersion at a wider angle is required using a dispersion medium, such as a prism. However, when wider-angle chromatic dispersion is to be performed using a dispersion medium for acquisition of a higher resolution, accordingly, a deflection angle required for the beam deflector becomes greater. Furthermore, when a change in the deflection angle of the beam deflector is fixed, the refractive index dispersion of the dispersion medium must be lowered to conduct the wideband measurement, and in this case, the resolution would be degraded.

Therefore, in this embodiment, light output by a beam deflector that includes an electro-optic crystal, such as KTN, is separated into beams directed in two different directions, so that both high-resolution measurement and wideband measurement can be performed simultaneously in one operation by the same spectroscope. One beam of the separated light is employed for spectroscopy of the entire wavelength range to be measured, i.e., is employed for wideband measurement, and the other beam is employed for spectroscopy for one part of the wavelength range at a high resolution, i.e., is employed for high-resolution measurement.

Figure 15:
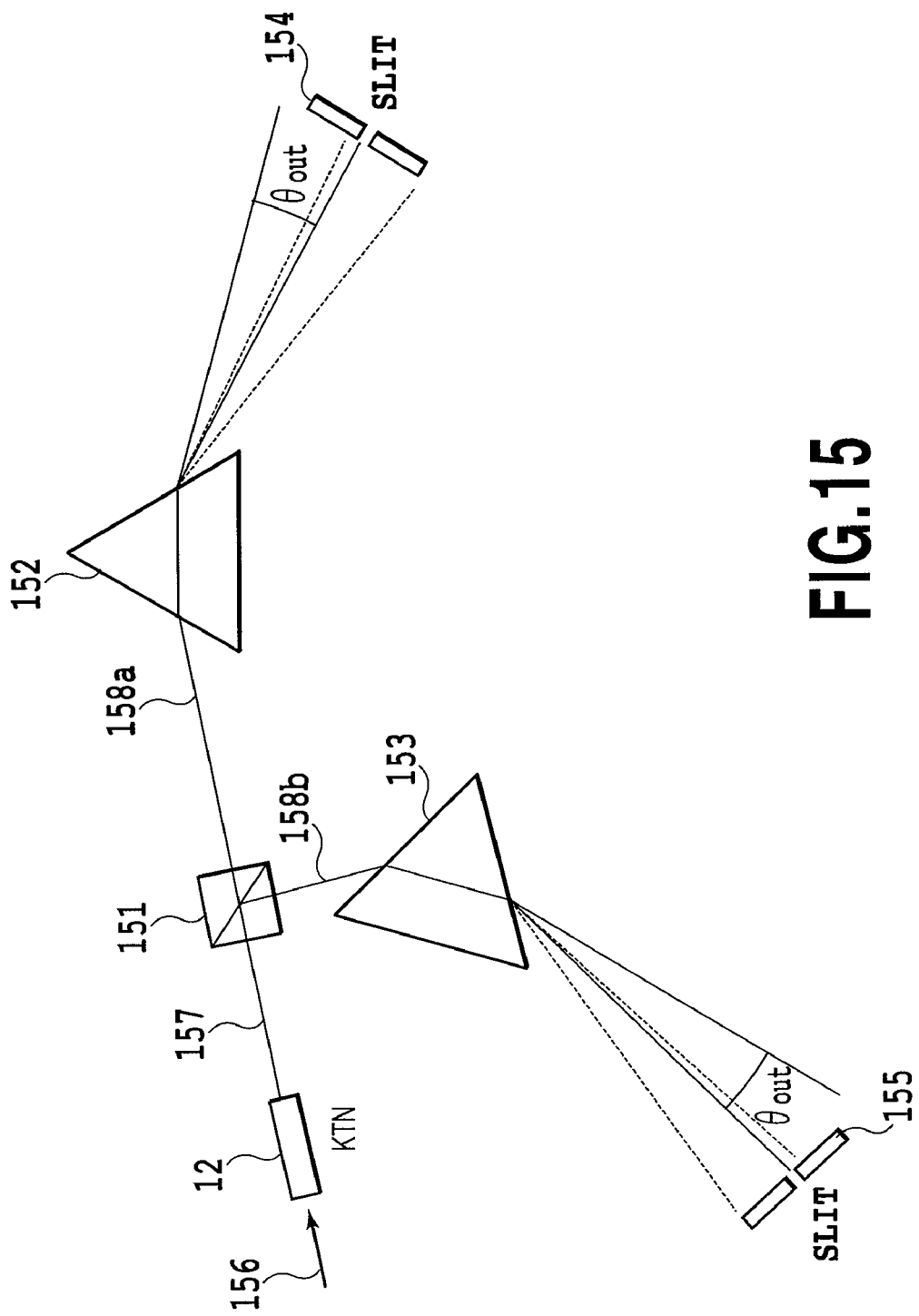
FIG. 15 is a diagram illustrating a spectroscope according to one more embodiment of the present invention.

FIG. 15 is a diagram illustrating a spectroscope according to this embodiment that can perform both high-resolution measurement and wideband measurement in one operation.

In FIG. 15, a polarizing beam splitter 151 is located at the rear of a beam deflector 12 that includes a KTN crystal 21, and serves as means for outputting incident light in two different directions.

When a voltage is applied to electrodes 22 and 23 of the beam deflector 12, inclination of the electric field occurs in the KTN crystal 21. When non-polarizing light 156 enters the KTN crystal 21, wherein the electric field is inclined, the s-polarization component and the p-polarization component of the incident light 156 are deflected in the KTN crystal 21. Since the electro-optic effect has polarization dependence property, the inclination of the refractive index change relative to the s-polarization component differs from the inclination relative to the p-polarization component. Therefore, the s-polarization component and the p-polarization component, which are deflected by the KTN crystal 21, provide different deflection angles.

In the specification for this invention, "p-polarization" represents polarization in a direction that is perpendicular to the optical axis, and matches the direction of the electric field generated between electrodes arranged in the electro-optic crystal. In FIG. 15, p-polarization is in a direction perpendicular to the optical axis, and along the plane of the paper.

Furthermore, in the specification for this invention, "s-polarization" represents polarization in a direction that is perpendicular to the optical axis, and is orthogonal to the direction of the electric field generated between the electrodes of the electro-optic crystal. In FIG. 15, the s-polarization is in a direction perpendicular to the plane of the paper.

Although, as described above, the beam deflector 12 outputs the p-polarization component and the s-polarization component upon application of a voltage, for simplification of the drawing in FIG. 15, the p-polarization component and the s-polarization component are collectively indicated as the light 157.

When the light 157 output by the beam deflector 12 enters the polarizing beam splitter 151, the splitter 151 separates the light 157 into the p-polarization component and the s-polarization component, and outputs these components in different directions. That is, the polarizing beam splitter 151 allows the p-polarization component of the input light 157 to pass through, and outputs this component as p-polarization light 158*a*. Further, the polarizing beam splitter 151 reflects the s-polarization component of the input light 157, and outputs this component as s-polarization light 158*b*. A prism 152 having a low refractive-index dispersion property (a small change in a refractive index according to a wavelength) is located on the side of the polarizing beam splitter 151 that outputs the light 158*a*. Further, a prism 153 with a refractive-index dispersion property higher than that for the prism 152 (a large change in a refractive index according to a wavelength) is located on the side of the polarizing beam splitter 151 that outputs the light 158*b*.

In addition, slit plates 154 and 155 are arranged as wavelength selection means respectively at the rear stages of the prisms 152 and 153.

When a measurement is to be performed with this arrangement, the incident light 156 that has an arbitrary polarization component, other than the p-polarization component and s-polarization component, enters the beam deflector 12. When a voltage has already been applied to the beam deflector 12 at this time, the p-polarization component and the s-polarization component are output by the beam deflector 12 at a predetermined deflection angle. When the light 157 that includes the p-polarization component and the s-polarization component enters the polarizing beam splitter 151, the polarizing beam splitter 151 separates the input light 157 for the individual polarization components and outputs the light components in two different directions. That is, the p-polarization component passes the polarization beam splitter 151, and enters the prism 152 as the light 158*a*, while the s-polarization component is reflected by the polarizing beam splitter 151, and enters the prism 153 as the light 158*b*.

The light 158*a* is dispersed by the prism 152, and the entire wavelength range to be detected (the desired wavelength band) is measured by a photodetector (not shown) that is located at the rear of the slit plate 154.

Assume that the detected wavelength range is 400 nm to 700 nm. Further, the voltage application state required for the beam deflector 12, under which light having the longest wavelength in the desired wavelength range is permitted to pass through the slit plate 154 is defined as a fifth voltage applied state. Furthermore, the voltage application state required for the beam deflector 12, under which light having the shortest wavelength in the desired wavelength range is permitted to pass through the slit plate 155 is defined as a sixth voltage applied state.

In the measurement process, the entire desired wavelength range can be measured by changing the fifth voltage applied state to the sixth voltage applied state, as needed.

It should be noted that a desired wavelength range for detection may be employed to designate the positions of the beam deflector 12, the polarizing beam splitter 151, the prism 152 and the slit plate 154, the material of the prism 152, the fifth and the sixth voltage applied states, etc.

The other light 158*b* is dispersed by the prism 153, and only one part of the wavelength range for detection (the desired wavelength range) is measured, at a high resolution, using a photodetector (not shown) that is located at the rear of the slit plate 155.

Assume that a wavelength range to be detected at a high resolution is 600 nm to 650 nm.

In this embodiment, the refractive index dispersion of the prism 153 is higher than the refractive index dispersion of the prism 152, which is used for detection of the entire desired wavelength range. Therefore, the prism 153 refracts light more than the prism 152. When the wavelength range, for example, of 500 nm to 750 nm is focused on, an angle formed by the optical axes of light having a wavelength of 500 nm and light having a wavelength of 750 nm, which are output by the prism 153 under a specific voltage applied state, is greater than an angle formed by the optical axes of light having a wavelength of 500 nm and light having a wavelength of 750 nm that are output by the prism 152. Thus, when the state in which a voltage is applied to the beam deflector 12 is changed from the fifth voltage applied state to the sixth voltage applied state, the width for a change in the wavelength is smaller for light that is output by the prism 153 and passes through the slit plate 155, than for light that is output by the prism 152 and passes through the slit plate 154.

Therefore, even in a case where a change in the deflection angle of the beam deflector 12 is fixed (a change in the voltage to be applied is fixed), the prism 153 provides a higher resolution measurement than the prism 152. That is, in this embodiment, on the prism 153 side, detection of light having a wavelength of 600 nm is enabled in the fifth voltage applied state, and detection of light having a wavelength of 650 nm is enabled in the sixth voltage applied state.

It should be noted that a desired wavelength range to be detected at a high resolution may be employed to designate the positions of the beam deflector 12, the polarizing beam splitter 151, the prism 153 and the slit plate 155, the material of the prism 153, the fifth voltage applied state and the sixth voltage applied state, etc.

Further, according to the arrangement of this embodiment, a measurement performed for the entire wavelength range to be detected and a measurement performed for one part of this wavelength range can be performed in only one operation, using the same device. That is, when the fifth voltage applied state is changed to the sixth voltage applied state, the entire wavelength range to be detected is measured on the prism 152 side, and one part of this wavelength range is measured on the prism 153 side.

For the effective employment of the prism 153, which is used for high-resolution measurement, a wavelength range to be detected at a high resolution should be variable. In this embodiment, therefore, it is preferable that a movable portion be provided for the slit plate 155 and that the slit plate 155 be moved as needed, so that a wavelength range to be detected at a high resolution can be varied.

In other words, when the slit plate 155 is fixed, a wavelength range (e.g., 600 nm to 650 nm) can be fixed for high-resolution detection.

Further, a wavelength range for high-resolution detection can be varied by moving the slit plate 155. In such a case, the slit plate 155 need simply be located along a rail, for example, and be manually moved, as desired. Or, a power controller, such as an actuator, may be provided to automatically move the slit plate 155.

In this embodiment, when the slit plate 155 is fixed at a specific location, and when the fifth voltage applied state is changed to the sixth voltage applied state, the wavelength range of light that enters the slit plate 155 becomes a desired wavelength range to be detected at a high resolution. Therefore, the wavelength range of light is changed in accordance with the position of the slit plate 155. Thus, when the movable slit plate 155 for this embodiment is employed, a variable wavelength range is obtained for light that enters the slit plate 155. That is, the position of the slit plate 155 is determined based on a desired wavelength range to be detected at a high resolution, so that when the fifth voltage applied state is changed to the sixth voltage applied state, light in the desired wavelength range enters the slit plate 155. In this manner, a variable wavelength range can be detected at a high resolution.

As described above, in this embodiment, the prism 152, which has a relatively low refractive index dispersion property, is employed to detect the entire desired wavelength range, and the prism 153, which has a relatively high refractive index dispersion property, is employed to detect one part of the desired wavelength range. Further, the light 156 used for measurement is deflected by the beam deflector 12 and is separated into two beams, and these beams enter the prism 152, which has the low refractive index dispersion property, and the prism 153, which has the high refractive index dispersion property, to perform spectroscopy. Therefore, the entire desired wavelength range can be measured on the prism 152 side, while at the same time, a high-resolution measurement can be performed on the prism 153 side.

Further, since as described above the light deflected by the beam deflector 12 is separated into light used for measurement of the entire desired wavelength range to be detected and light used for high-resolution measurement, only the voltage control for the beam deflector 12 is required to perform both the measurement of the entire wavelength range and the high-resolution measurement.

In this embodiment, either the p-polarization component or the s-polarization may be employed for measurement of the entire wavelength range to be detected and for high-resolution measurement. However, when the p-polarization component is employed, the high-resolution measurement is enabled for the same wavelength range, or wide-range measurement is enabled for the same resolution.

In this embodiment, as described above, it is important that light deflected by the beam deflector 12 be separated into two beams to enter the prism 152 and the prism 153, and the use of the polarizing beam splitter 151 is not essential. Further, arbitrary means, such as a half-silvered mirror, may be employed for this embodiment, instead of the polarizing beam splitter 151, so long as the arbitrary means can separate and output incident light in two different directions.

When a half-silvered mirror is employed, it is preferable that either the p-polarization component or the s-polarization component (preferably, the p-polarization component) enter the prisms 152 and 153 to perform appropriate measurement.

In a case wherein the secondary electro-optic constants $s_{11}$ and $s_{12}$ of the KTN crystal 21 are provided with signs that are inverted from each other, the s-polarization component and the p-polarization component are deflected in opposite directions. Therefore, when the p-polarization component is employed for the individual prisms to perform measurement, the s-polarization component also enters the prisms and could adversely affect the measurement when the polarity of a voltage, applied to the beam deflector 12, is changed. This is why using either the p-polarization component or the s-polarization component is appropriate when a half-silvered mirror is employed.

Therefore, for a case wherein a half-silvered mirror is employed as beam splitting means, a polarizer can be located in front of the beam deflector 12 to allow either the p-polarization component or the s-polarization component to enter the beam deflector 12.

It is also important for this embodiment that, as described above, only one operation using a single device be required to measure the entire desired wavelength range, and one part of the wavelength range (the high-resolution measurement). In other words, the essential point of this embodiment is that the incident light 156 to be measured is separated, and that one of the separated lights enters the prism 152 to measure the entire desired wavelength range, while the other beam of the separated light enters the prism 153 to perform the high-resolution measurement.

Figure 16:
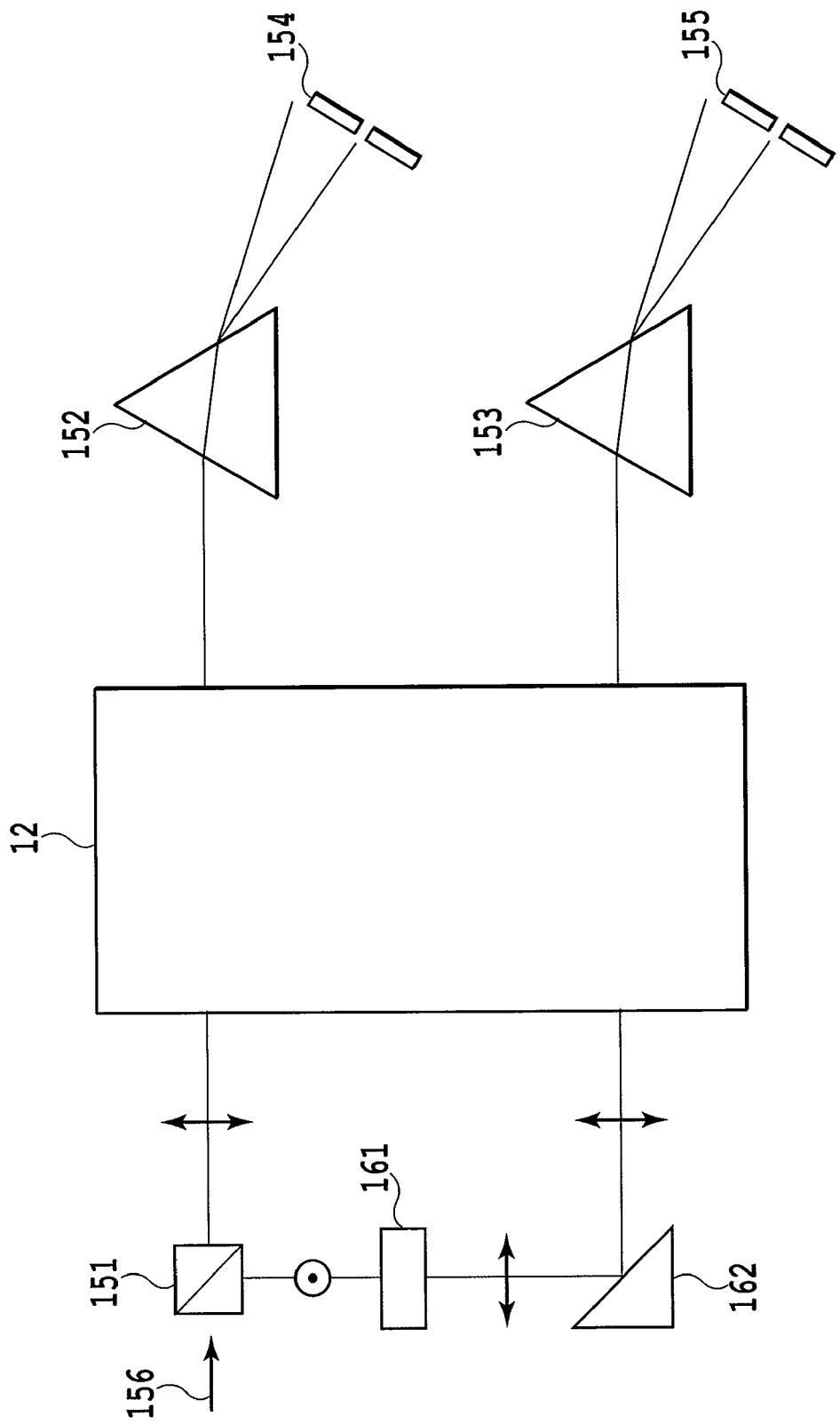
FIG. 16 is a diagram illustrating a spectroscope according to another embodiment of the present invention.

In this embodiment, as shown in FIG. 16, the incident light 156 may be separated into two beams to the front of the beam deflector 12, as shown in FIG. 16. In FIG. 16, reference numeral 161 denotes a $\lambda/2$ wave plate and reference numeral 162 denotes a mirror.

Since use of the p-polarization component is preferable for this embodiment, it is appropriate that the $\lambda/2$ wave plate be employed to change the polarization direction of the s-polarization component that is separated by the polarizing beam splitter 151. That is, when the $\lambda/2$ wave plate 161 is arranged to the rear of the polarizing beam splitter 151, from which the s-polarization component is output, the p-polarization component can enter both of the prisms 152 and 153.

It should be noted, of course, that the $\lambda/2$ wave plate 161 is not necessarily provided.

In the arrangement in FIG. 16, wherein the deflection of the beam deflector is controlled at one location, light that will enter the prism 152 and light that will enter the prism 153 should be projected to two different areas of the same beam deflector 12. Therefore, the mirror 162 is arranged to the rear of the $\lambda/2$ wave plate 161, and is employed to change the direction of light that is output by the $\lambda/2$ wave plate 161.

Figure 17:
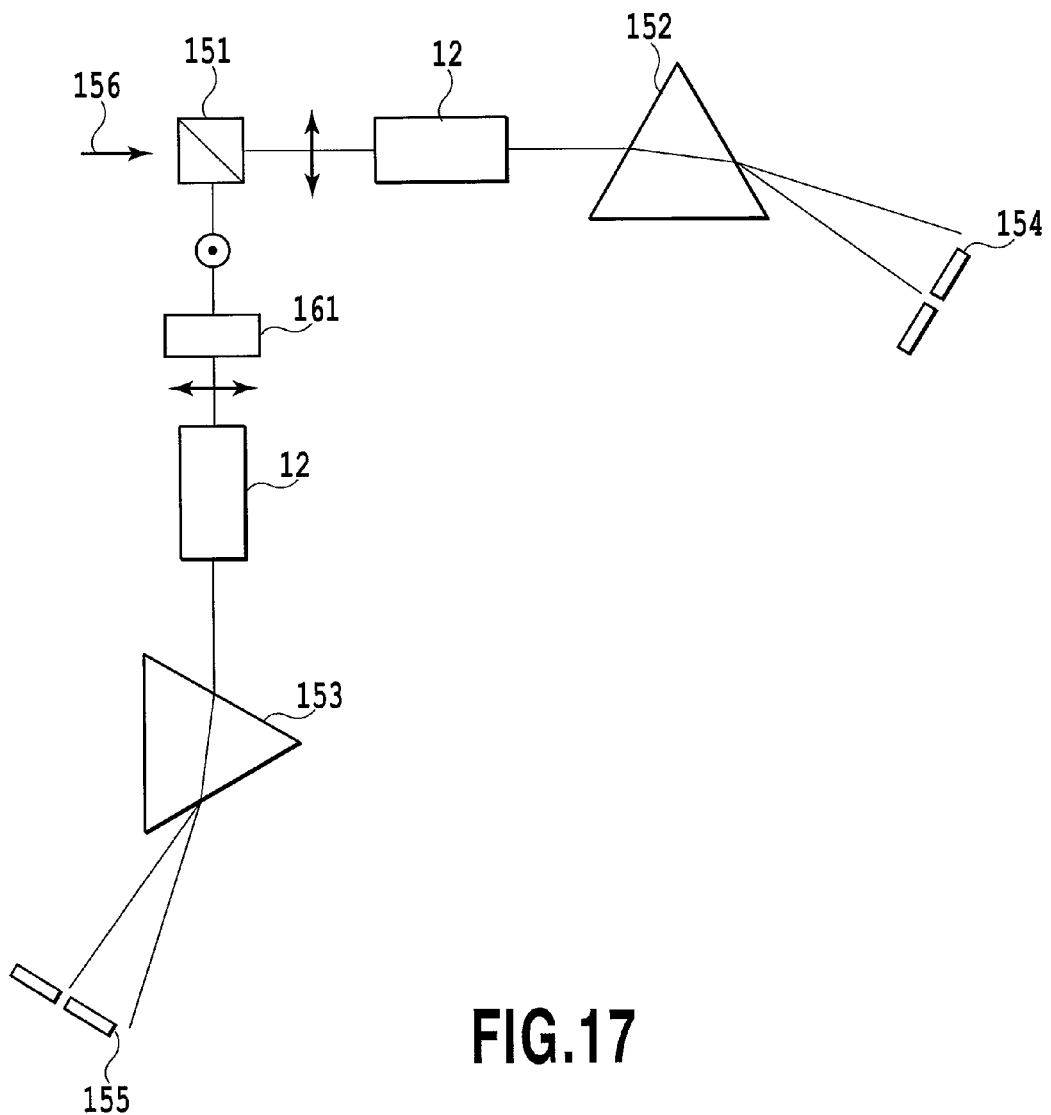
FIG. 17 is a diagram illustrating a spectroscope according to an additional embodiment of the present invention.

In this embodiment, as shown in FIG. 17, the beam deflector 12 may also be located along the optical paths of the light beams that are obtained by the polarizing beam splitter 151.

Sixth Embodiment

The objective of this embodiment is the provision of high sensitivity for a spectroscope, in addition to securing a short time response and a small-sized device.

In order to provide a high-sensitivity spectroscope, it is desirable that as large a quantity of light as possible enter a beam deflector that includes an electro-optic crystal, such as KTN, and that the size of an opening in the input surface of the beam deflector be enlarged. Enlarging of the opening is especially important for spectroscopy of incoherent light that is difficult to concentrate, or to collimate at a small spot.

Assume that a beam deflector includes an electro-optic crystal, such as KTN, having a secondary electro-optic effect, and deflects a light beam by generating the inclination of a refractive index between electrodes. In a case wherein an opening is enlarged, when a distance between the electrodes (thickness of the crystal) is a times, a voltage of a $\sqrt{a}$ times is required to obtain the same deflection angle for the beam deflector.

Therefore, an electro-optic crystal, such as KTN, employed in this embodiment, has a thickness (a distance between the electrodes) that is maintained at a value required to provide a specific deflection angle, and a width that is greater than the thickness, so that the opening can be enlarged in the input surface of the beam deflector without increasing the voltage that is required to obtain the specific deflection angle. Further, light having an elliptic shape in cross section is allowed to enter the beam deflector.

In this specification, the "thickness (of the electro-optic crystal)" represents the length of an electro-optic crystal from one face to the other on which the electrodes are arranged. Further, in this specification, the "width (of the electro-optic crystal)" represents the width of the electro-optic crystal in a direction across the thickness of the electro-optic crystal, or perpendicular to the direction in which light propagates in the electro-optic crystal.

Figure 18:
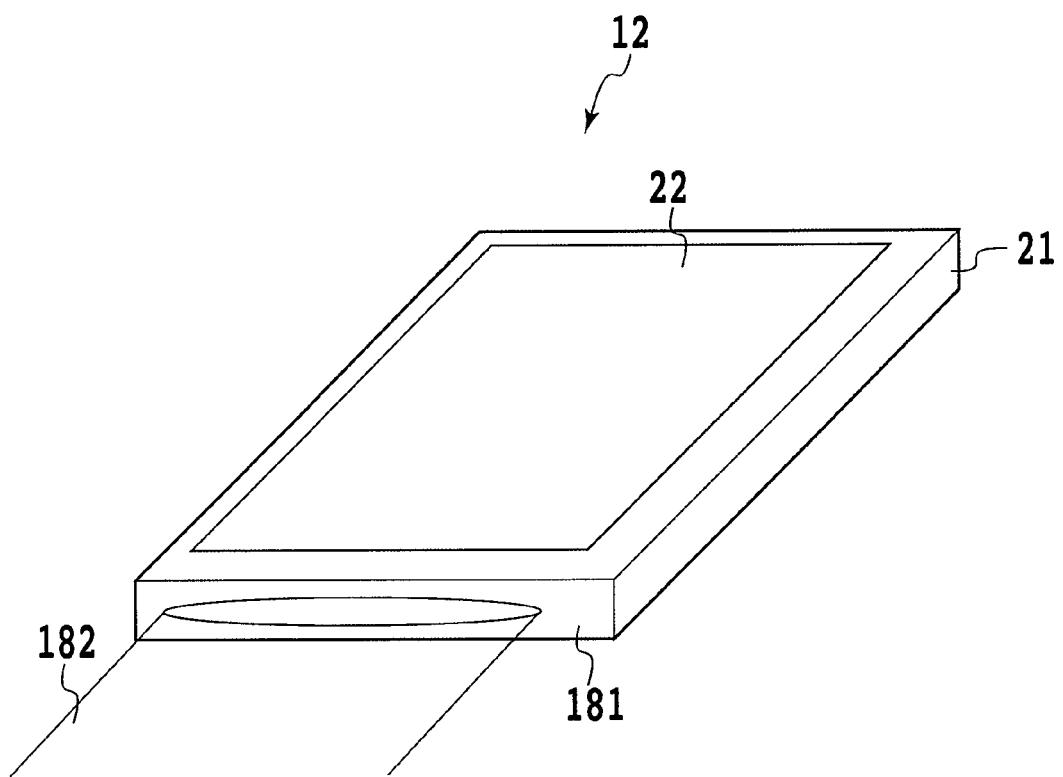
FIG. 18 is a perspective view of a beam deflector according to a further embodiment of the present invention.

FIG. 18 is a perspective view of a beam deflector according to this embodiment.

In FIG. 18, the width of a KTN crystal 21 is greater than the thickness. Therefore, the size of an opening in an input surface 181 of the beam deflector 12 can be increased, without changing the distance between electrodes 22 and 23. As a result, the raising of a required voltage can be prevented, even when the opening is enlarged.

Furthermore, in this embodiment, incident light 182 having an elliptic shape in cross section enters the input surface 181. Compared with a case in which an entering light has a circular shape in cross section, the radius of which is as long as the short axis of the elliptic shape of the incident light 182 in cross section, the quantity of light input can be increased by a value equivalent to the extension of the long axis of the elliptic shape of the incident light 182 in cross section. Therefore, high sensitivity can be obtained for a spectroscope, without increasing the level of a required voltage.

According to this embodiment, when light to be measured enters, for example, a cylindrical lens or slit, the incident light 182, which has an elliptic shape in cross section, can be obtained. Means that facilitates the entry, to the input surface 182, of light having an elliptic shape in cross section is not limited to a cylindrical lens or a slit, and arbitrary means can be employed so long as the means can output the incident light as light having an elliptic shape in cross section.

When focusing on the conventional method for increasing the size of an opening in the direction of thickness, the opening can be enlarged by increasing the thickness of the KTN crystal 21; however, since the distance between the electrodes 22 and 23 is extended, as previously described, a higher voltage is required to obtain the same deflection angle.

Therefore, in this embodiment, the direction of width that does not affect a required voltage is controlled, instead of controlling the thickness that affects a voltage, so that the opening size is enlarged without causing a rise in the voltage that is required. That is, the width of the KTN crystal 21 is set so greater than the thickness, while the voltage required for providing a specific deflection angle is maintained, i.e., while a thickness correlated with the required voltage is maintained. As a result, the size of the opening can be increased.

Since the opening is enlarged in consonance with a difference in the width of the KTN crystal 21 and the thickness, the incident light 182 can appropriately enter the beam deflector 12, even when the light is incoherent light. However, for conventional incident light having a circular shape in cross section, even when an opening size is increased and the incident light is appropriately coupled with the beam deflector 12, the radius of the circle that is the cross section of the incident light becomes a limiting factor, from the viewpoint of the quantity of light input. Therefore, regardless of whether the opening is enlarged by increasing the width of the KTN crystal 21, the thickness of the KTN crystal 21 will not be increased, and an increase of the quantity of light input is not anticipated.

On the other hand, in this embodiment, since the incident light 182 has an elliptic shape in cross section, the long axis of the elliptic shape of the incident light 182 can be increased by a length equivalent to an extension of the width of the KTN crystal 21. Accordingly, the quantity of light input to the beam deflector 12 can be increased, and the sensitivity can be improved.

As described above, according to this embodiment, it is important that the size of the opening in the input surface of the beam deflector be enlarged, so that even incoherent light can be appropriately coupled with the beam deflector. At this time, when the thickness of the electro-optic crystal is multiplied a times to extend the opening, a voltage required for the same deflection angle could be raised a√a times, and a voltage rise would have occurred. Therefore, in this embodiment, the width of an electro-optic crystal employed is greater than the thickness, so that the opening size can be extended while an increase in a required voltage can be prevented.

Furthermore, when the beam deflector is provided by setting the width of the electro-optic crystal so greater than the thickness, thereby obtaining a large opening and preventing a rise in the level of a required voltage, incident light having an elliptic shape, in cross section, can enter the input surface of the beam deflector, so that the long axis of the elliptic shape is parallel to the width of the electro-optic crystal. As a result, the quantity of light input to the beam deflector can be increased and a high-sensitivity spectroscope can be provided.

Seventh Embodiment

The objective of this embodiment is the provision of a simple, high-resolution spectroscope, in addition to securing a short time response and the downsizing of a device.

According to this embodiment, in order to obtain a spectroscope having a short time response and a simple arrangement, at the least, either the input end or the output end of a beam deflector 12 is machined so the end has a wedge shaped face. Through this machining, a beam deflector and spectroscopic means, such as a prism, like those that have been employed in the first to the sixth embodiments, can be provided using a single device.

Figure 19:
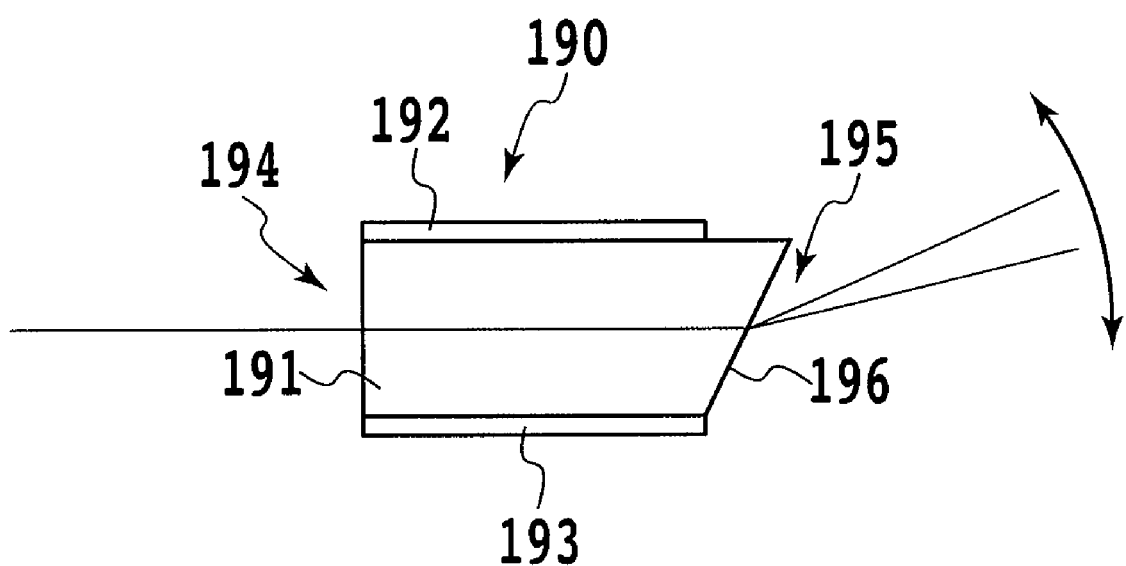
FIG. 19 is a diagram illustrating a spectroscope according to one more embodiment of the present invention.

FIG. 19 is a diagram illustrating a spectroscope according to this embodiment.

In FIG. 19, a spectroscope 190 includes a KTN crystal 191. An electrode 192 is formed on a first face of the KTN crystal 191, and an electrode 193 is formed on a second face, opposite the first face. Reference numeral 194 denotes the input end of the spectroscope 190, and reference numeral 195 denotes the output end of the spectroscope 190.

The output end 195 of the spectroscope 190 (the KTN crystal 191) is wedge shaped, at an angle inward of the plane where a light beam is deflected by the application of a voltage, thereby providing a wedge shaped output end 196. That is, the wedge shaped output end 196 is formed at the output end 195, so that its thickness is gradually reduced and a slope is formed from the second face, where the electrode 193 is formed, toward the first face, where the electrode 192 is formed.

The wedge shaped forming process can be performed by producing the beam deflector 12, shown in FIG. 5, and cutting or grinding the output end.

When the wedged shaped output end 196 is formed in this manner, the light output from the wedge shaped output end 196 can be distributed in accordance with the state in which a voltage is applied to the electrodes 192 and 193.

According to this embodiment, even when the output end 195 has an wedge shaped output end that forms an angle in a direction perpendicular to the plane where a light beam is deflected (referring to FIG. 19, the wedged output end that is gradually thinned from the front on paper (or the rear on paper) to the rear on paper (or the front on paper)), the beam deflection direction does not match the dispersing direction using the slope of the wedge, and therefore, the device does not function as a spectroscope. On the other hand, when as shown in FIG. 19 the direction in which the thickness of the KTN crystal 191 is changed matches the direction in which the electric field is applied, the dispersing direction and the beam deflection direction are identical at the wedge shaped output end 196. Thus, the device can appropriately function as a spectroscope.

When the output end of an electro-optic crystal, such as KTN, is wedge shaped, light that has propagated in the electro-optic crystal obliquely reaches the interface at the output end (the wedge shaped output end). Since an electro-optic crystal, such as KTN, has a wavelength dependence of a refractive index (generally, a refractive index is high for a short wavelength), the output angle of each wavelength is changed when the light has reached the interface obliquely. As a result, the processing performed until dispersion can only be performed using the beam deflector.

As described above, since the wedge shaped output end 196 is employed for this embodiment, light can be dispersed and output at the output end 196 for the individual wavelengths. Further, since the wedge shaped output end 196 is formed so that the direction in which the thickness is gradually reduced matches the direction of the electric field formed between the electrodes 192 and 193, the direction in which dispersed light is spread (the dispersing direction) can match the beam deflection direction, and the function of a spectroscope can be provided.

When a satisfactory resolution is not obtained through only the dispersion at the output end of the KTN crystal 191, a dispersing medium, such as a prism or a diffraction grating, may be arranged to the rear of the spectroscope 190.

Figure 20A:
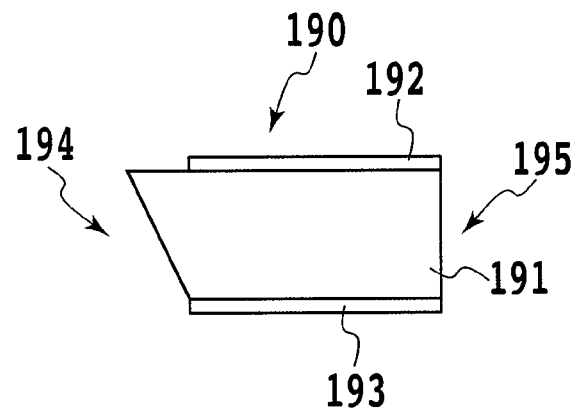
FIG. 20A is a diagram illustrating a spectroscope according to yet another embodiment of the present invention.
Figure 20B:
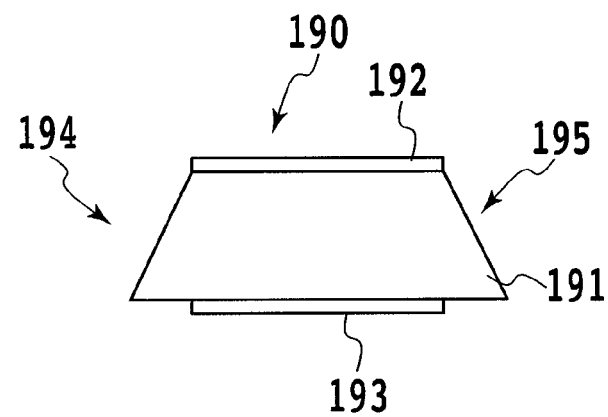
FIG. 20B is a diagram illustrating a spectroscope according to an additional embodiment of the present invention.
Figure 20C:
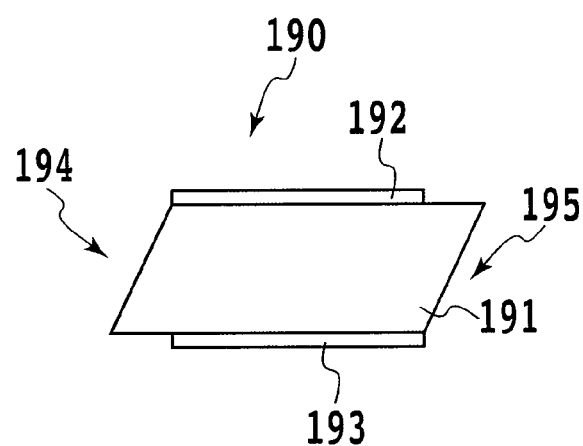
FIG. 20C is a diagram illustrating a spectroscope according to another embodiment of the present invention.

In addition, in this embodiment, the end to be wedge shaped is not limited to the output end, and may be the input end (FIG. 20A), or both the input end and the output end (FIG. 20B or 20C).

While referring to FIGS. 21 and 22, an explanation will be given for the effects obtained by wedge shaping the output end of the spectroscope 190, as in this embodiment.

Figure 21:
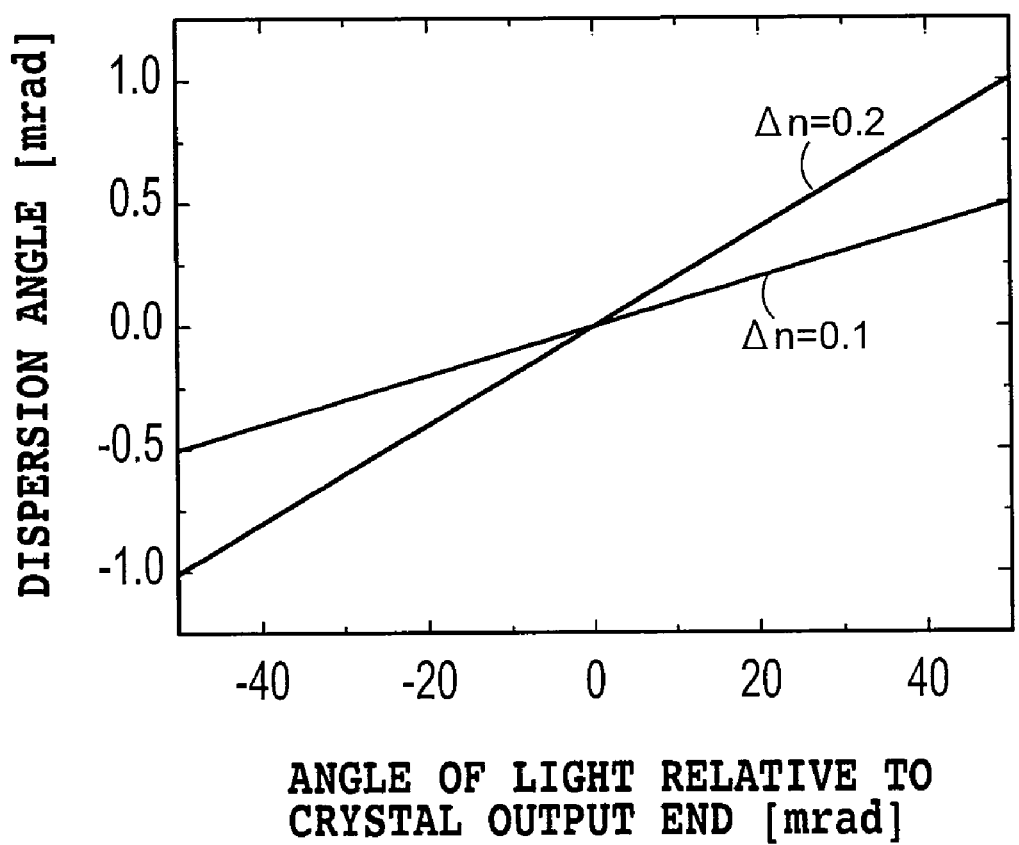
FIG. 21 is a diagram for explaining the effects obtained for the embodiment of the present invention when the output end is wedge shaped.
Figure 22:
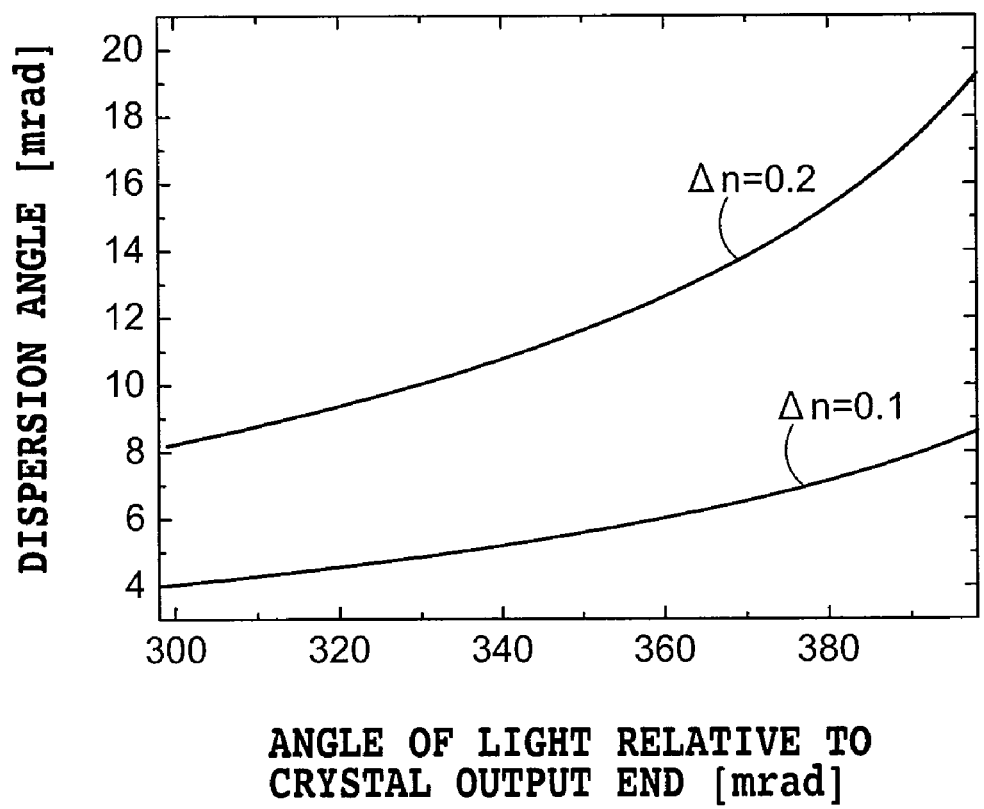
FIG. 22 is a diagram for explaining the effects obtained for the embodiment of the present invention when the output end is wedge shaped.

FIGS. 21 and 22 show relationships between an angle at which light that propagated in the KTN crystal 191 has reached the output end 195, and a dispersion angle that is a change in the angle at which light is externally output from the crystal. When the refractive index of the KTN crystal 191 for a wavelength 700 nm is 2.25, and the refractive index for a wavelength of 400 nm is higher by 0.1 or 0.2, a difference in the output angle between the wavelengths 700 nm and 400 nm is described as a dispersion angle. The deflection angle inside the KTN crystal 191 is −50 mrad to 50 mrad, regardless of the wavelength.

The example in FIG. 21 is a relationship established for a case wherein the output end 195 is not wedge shaped. In this case, as shown in FIG. 21, the deflection angle inside the KTN crystal 195 is increased so the light obliquely reaches the output end 195, and the dispersion angle outside the crystal is also increased, but only to about 1 mrad.

The example in FIG. 22 is provided for a case wherein the output end 195 is wedge shaped, so that an angle of 20 degrees (349 mrad) is formed relative to the wedge shaped output end 196 of the KTN crystal 191, when light is not deflected inside the KTN crystal 191, and shows a relationship established between the angle at which light reaches the wedge shaped output end 196 of the KTN crystal 191 and the dispersion angle. When a refractive index difference is 0.1, the maximum dispersion angle is 8 mrad, and when the refractive index difference is 0.2, the obtained dispersion angle is 19 mrad, at the maximum. As is apparent from this, when the angle relative to the output end of the KTN crystal 191 is large, the dispersion angle is increased and remarkable effects can be obtained using the wedge shaped end.

Furthermore, when the output end 195 of the KTN crystal 191 is not wedge shaped, there is a case wherein the dispersion angle becomes 0, as shown in FIG. 21. On the other hand, when, as in this embodiment, the wedge shaped output end 196 is formed at the output end 195 of the KTN crystal 191, a state in which the dispersion of light always occurs is obtained, as shown in FIG. 22.

Therefore, when at the least, either the input end or the output end of the KTN crystal is wedge shaped, as in this embodiment, such a device can function as a spectroscope, and a spectroscope having a simple structure can be provided.

The invention claimed is:

1. A spectroscope comprising:
   a beam deflector for deflecting an incident light beam, the beam deflector comprising:
      an electro-optic crystal having an electro-optic effect, and
      paired electrodes used to apply an electric field inside the electro-optic crystal;
   spectroscopic means for dispersing the deflected light beam output by the beam deflector; and
   wavelength selection means for selecting light having an arbitrary wavelength from the light dispersed by the spectroscopic means;
   wherein the beam deflector outputs the incident light beam at a deflection angle relative to the optical axis of the incident light beam that varies between:
      a first deflection angle in a first voltage applied state in which a first voltage is applied to the paired electrodes for detection of the light having the shortest wavelength in a desired wavelength range for detection, and
      a second deflection angle in a second voltage applied state in which a second voltage is applied to the paired electrodes for detection of the light having the longest wavelength in the desired wavelength range for detection, the second deflection angle being different than the first deflection angle;
   wherein the beam deflector and the spectroscopic means are separated by a distance equivalent to a predetermined optical path length so that the deflected light beam output from the beam deflector is incident at different positions on the stereoscopic means at the first voltage applied state and the second voltage applied state; and
   wherein the wavelength selection means is positioned where the optical axis of the shortest wavelength light output from the spectroscopic means at the first voltage applied state intersects the optical axis of the longest wavelength light output from the spectroscopic means at the second voltage applied state.

2. The spectroscope according to claim 1, wherein a width of the beam deflector is greater than a thickness of the beam deflector.

3. The spectroscope according to claim 2, further comprising:
means for projecting, to the beam deflector, light having an elliptic cross sectional shape, wherein the light having the elliptic cross sectional shape enters the beam deflector, so that a direction along the long axis of the elliptic shape matches the direction of the width of the beam deflector.

4. The spectroscope according to claim 1, further comprising a polarizer for projecting, onto the beam deflector, light consisting of only a component along a polarization axis, which is parallel to the electric field.

5. The spectroscope according to claim 1, wherein the spectroscopic means comprises:
a prism comprising:
an apex;
a planar input surface extending from the apex; and
a planar output surface extending from the apex, an angle β being formed between the planar input surface and the planar output surface at the apex, and the distance from the apex to output positions of the dispersed light on the planar output surface conforming to the following equations:

$$F1 = P1 \cos \beta + P1 \tan(\beta - \sin^{-1}(1/n \cdot \sin \theta_3)) \sin \beta; \text{ and}$$

$$F2 = P2 \cos \beta + P2 \tan(\beta - \sin^{-1}(1/n \cdot \sin(\theta_3 - \phi))) \sin \beta$$

where:
F1 denotes a distance from the apex to a first output position of the dispersed light on the planar output surface of the prism,
n denotes the refractive index of the prism,
P1 denotes a distance between the apex and a first input position of the dispersed light on the planar input surface of the prism,
$\theta_3$ denotes an angle relative to the planar input surface at which the light output by the beam deflector enters the prism at the first input position,
F2 denotes a distance from the apex to a second output position of the dispersed light on the planar output surface of the prism,
φ denotes the second deflection angle of the deflected light beam output by the beam deflector in the second voltage applied state, and
P2 denotes a distance from the apex to the second input position.

6. The spectroscope according to claim 1, wherein:
the spectroscopic means comprises:
a first prism having a first refractive index dispersion; and
a second prism having a second refractive index dispersion, the second refractive index dispersion being greater than the first refractive index dispersion; and
wherein the spectroscope further comprises:
dividing means for outputting, in two different directions, light that is input into the dividing means, the first and second prisms being positioned such that the light output in the two different directions respectively enter the first prism and the second prism.

7. The spectroscope according to claim 6, wherein:
the dividing means is arranged after the beam deflector and before the first and second prisms; and
the dividing means outputs, in the two different directions, the light that is output by the beam deflector.

8. The spectroscope according to claim 6, wherein:
the dividing means is located in front of the beam deflector; and
the light output in the two different directions enters different areas in the beam deflector, and is transmitted to the first and the second prisms.

9. The spectroscope according to claim 6, wherein:
the beam deflector comprises a first beam deflector and a second beam deflector;
the dividing means is located in front of the first and the second beam deflectors; and
the light output in the two different directions enters the first and the second beam deflector and is transmitted to the first and the second prisms.

10. The spectroscope according to claim 6, wherein:
the wavelength selection means comprises first wavelength selection means located at the rear of the first prism, and second wavelength selection means located at the rear of the second prism; and
the second wavelength means is movable.

11. The spectroscope according to claim 1, wherein, at the least, either an input end or an output end of the beam deflector is wedge shaped, so that a thickness of the wedge shaped end is gradually reduced from a first face, where a first electrode of the paired electrodes is located, toward a second face, opposite the first face, where a second electrode of the paired electrodes is located.

12. The spectroscope according to claim 1, wherein:
the beam deflector and the spectroscopic means are prepared using the same electro-optic crystal; and
at the least, either an input end or an output end of the electro-optic crystal is wedge shaped, so that a thickness of the wedge shaped end is gradually reduced from a first face, on which a first electrode of the paired electrodes is located, toward a second face, opposite the first face, on which a second electrode, of the paired electrodes, is located.

13. The spectroscope according to claim 1, wherein the spectroscopic means comprises a diffraction grating.

14. The spectroscope according to claim 1, wherein the wavelength selection means comprises a slit plate.

15. The spectroscope according to claim 1, wherein the electro-optic crystal comprises one or more of: $KTaO_3$, $KTa_{1-x}Nb_xO_3$, $K_{1-y}Li_yTa_{1-x}Nb_xO_3$ (0<x<1, 0<y<1), $LiNbO_3$, $LiTaO_3$, $KNbO_3$, $KTiOPO_4$, $BaTiO_3$, $SrTiO_3$, $Ba_{1-x}Sr_xTiO_3$ (0<x<1), $Ba_{1-x}Sr_xNb_2O_6$ (0<x<1), $Sr_{0.75}Ba_{0.25}Nb_2O_6$, $Pb_{1-y}La_yTi_{1-x}Zr_xO_3$ (0<x<1, 0<y<1), $Pb(Mg_{1/3}Nb_{2/3})O_3$—$PbTiO_3$, $KH_2PO_4$, $KD_2PO_4$, $(NH_4)H_2PO_4$, $BaB_2O_4$, $LiB_3O_5$, $CsLiB_6O_{10}$, GaAs, CdTe, GaP, ZnS, ZnSe, ZnTe, CdS, CdSe and ZnO.

16. A spectroscope comprising:
a beam deflector comprising:
an electro-optic crystal having an electro-optic effect, and
paired electrodes used to apply an electric field inside the electro-optic crystal;
dividing means for outputting, in two different directions, inputted light; and
spectroscopic means for dispersing deflected light output by the beam deflector, the spectroscopic means comprising:
a first prism having a first refractive index dispersion, the first prism being positioned so as to receive and disperse light output by the dividing means in one of the two different directions;
a second prism having a second refractive index dispersion that is greater than the first refractive index dispersion, the second prism being positioned to receive and disperse light output by the dividing means in the other of the two different directions; and wavelength selection means for selecting light having an arbitrary wavelength from the light dispersed and output by the spectroscopic means.

17. The spectroscope according to claim 16, wherein the dividing means is positioned to receive the deflected light output from the beam deflector and to output the deflected light in the two different directions to be received by the first and second prisms.

18. The spectroscope according to claim 16, wherein the dividing means is positioned to receive incident light and to output the incident light in the two different directions into different areas of the beam deflector so that the light is deflected in two different directions by the beam deflector to be received by the first and second prisms.

\* \* \* \* \*